US011826787B2

(12) United States Patent
Wagner et al.

(10) Patent No.: US 11,826,787 B2
(45) Date of Patent: *Nov. 28, 2023

(54) SYSTEMS AND METHODS FOR PROVIDING SINGULATION OF OBJECTS FOR PROCESSING USING OBJECT MOVEMENT REDISTRIBUTION

(71) Applicant: Berkshire Grey Operating Company, Inc., Bedford, MA (US)

(72) Inventors: Thomas Wagner, Concord, MA (US); Kevin Ahearn, Nebo, NC (US); John Richard Amend, Jr., Belmont, MA (US); Benjamin Cohen, Somerville, MA (US); William Hartman Fort, Stratham, NH (US); Michael Dawson-Haggerty, Pittsburgh, PA (US); Christopher Geyer, Arlington, MA (US); Jennifer Eileen King, Oakmont, PA (US); Thomas Koletschka, Cambridge, MA (US); Michael Cap Koval, Mountain View, CA (US); Kyle Maroney, North Attleboro, MA (US); Matthew T. Mason, Pittsburgh, PA (US); William Chu-Hyon McMahan, Cambridge, MA (US); Gene Temple Price, Cambridge, MA (US); Joseph Romano, Arlington, MA (US); Daniel Smith, Canonsburg, PA (US); Siddhartha Srinivasa, Seattle, WA (US); Prasanna Velagapudi, Pittsburgh, PA (US); Thomas Allen, Reading, MA (US)

(73) Assignee: Berkshire Grey Operating Company, Inc., Bedford, MA (US)

( * ) Notice: Subject to any disclaimer, the term of this patent is extended or adjusted under 35 U.S.C. 154(b) by 415 days.

This patent is subject to a terminal disclaimer.

(21) Appl. No.: 16/998,049

(22) Filed: Aug. 20, 2020

(65) Prior Publication Data
US 2020/0391250 A1    Dec. 17, 2020

Related U.S. Application Data

(63) Continuation of application No. 15/961,294, filed on Apr. 24, 2018, now Pat. No. 10,792,706.
(Continued)

(51) Int. Cl.
B07C 1/04       (2006.01)
B07C 3/00       (2006.01)
(Continued)

(52) U.S. Cl.
CPC .................. B07C 1/04 (2013.01); B07C 3/00 (2013.01); B07C 3/08 (2013.01); B07C 5/02 (2013.01);
(Continued)

(58) Field of Classification Search
CPC .... B07C 1/04; B07C 3/00; B07C 3/08; B07C 5/02; B07C 5/36; B07C 2501/0063;
(Continued)

(56) References Cited

U.S. PATENT DOCUMENTS 3,592,326 A * 7/1971 Zimmerle ................. B07C 1/20
                                                            198/405
3,734,286 A    5/1973 Simjian
(Continued)

FOREIGN PATENT DOCUMENTS

AU    2006204622 A1    3/2007
CN    102040092 A      5/2011
(Continued)

OTHER PUBLICATIONS

Notice on Second Office Action and First Office Action (along with its English translation) issued by the China National Intellectual Property Administration in related Chinese Patent Application No. 201880038515.7 dated May 11, 2021, 21 pages.
(Continued)

Primary Examiner — Thomas Randazzo
(74) Attorney, Agent, or Firm — Gesmer Updegrove LLP

(57) ABSTRACT

A processing system including a singulation system is disclosed. The singulation system includes a conveying system for moving objects to be processed from a source area along a first direction, a detection system for detecting objects at the conveying system, and for selecting certain selected objects for redistribution on the conveying system, and a movement redistribution system for redistributing the certain selected objects on the conveying system for providing a singulated stream of objects.

38 Claims, 20 Drawing Sheets

Related U.S. Application Data

(60) Provisional application No. 62/489,121, filed on Apr. 24, 2017.

(51) Int. Cl.

| | | |
|---|---|---|
| B07C 3/08 | (2006.01) | |
| B07C 5/02 | (2006.01) | |
| B07C 5/36 | (2006.01) | |
| B25J 9/00 | (2006.01) | |
| B65B 5/10 | (2006.01) | |
| B65B 5/12 | (2006.01) | |
| B65B 35/06 | (2006.01) | |
| B65B 35/24 | (2006.01) | |
| B65B 35/36 | (2006.01) | |
| B65B 57/14 | (2006.01) | |
| G05B 19/418 | (2006.01) | |
| B65G 47/08 | (2006.01) | |
| B65G 47/28 | (2006.01) | |
| B25J 9/16 | (2006.01) | |
| B65G 61/00 | (2006.01) | |
| B65G 47/96 | (2006.01) | |
| B65G 47/46 | (2006.01) | |

(52) U.S. Cl.
CPC .............. *B07C 5/36* (2013.01); *B25J 9/0084* (2013.01); *B25J 9/0093* (2013.01); *B65B 5/101* (2013.01); *B65B 5/106* (2013.01); *B65B 5/12* (2013.01); *B65B 35/06* (2013.01); *B65B 35/24* (2013.01); *B65B 35/36* (2013.01); *B65B 57/14* (2013.01); *B65G 47/08* (2013.01); *B65G 47/28* (2013.01); *G05B 19/4182* (2013.01); *B07C 2501/0063* (2013.01); *B25J 9/1697* (2013.01); *B65G 47/46* (2013.01); *B65G 47/96* (2013.01); *B65G 47/962* (2013.01); *B65G 61/00* (2013.01); *B65G 2203/0208* (2013.01); *B65G 2203/041* (2013.01); *G05B 2219/40078* (2013.01); *G05B 2219/40554* (2013.01)

(58) Field of Classification Search
CPC .. B07C 3/003; B07C 3/14; B07C 3/18; B07C 3/20; B25J 9/0084; B25J 9/0093; B25J 9/1697; B65B 5/101; B65B 5/106; B65B 5/12; B65B 35/06; B65B 35/02; B65B 35/03; B65B 57/14; B65G 47/08; B65G 47/28; B65G 47/04; B65G 47/96; B65G 47/962; B65G 61/00; B65G 2203/0208; B65G 2203/041; G05B 19/418; G05B 2219/40078; G05B 2219/40554; Y02P 90/02

See application file for complete search history.

(56) References Cited

U.S. PATENT DOCUMENTS

| | | | | |
|---|---|---|---|---|
| 4,073,375 | A | * | 2/1978 | Hart ...................... B65G 47/88 198/572 |
| 4,186,836 | A | | 2/1980 | Wassmer et al. |
| 4,244,459 | A | | 1/1981 | Garrett |
| 4,360,098 | A | * | 11/1982 | Nordstrom ............. B65G 47/31 198/572 |
| 4,722,653 | A | | 2/1988 | Williams et al. |
| 4,759,439 | A | | 7/1988 | Hartlepp |
| 4,819,784 | A | | 4/1989 | Sticht |
| 4,846,335 | A | | 7/1989 | Hartlepp |
| 4,895,242 | A | | 1/1990 | Michel |
| 5,082,103 | A | * | 1/1992 | Ross ...................... B65G 47/31 198/572 |
| 5,097,939 | A | * | 3/1992 | Shanklin ................ B65G 47/31 198/460.1 |
| 5,190,162 | A | | 3/1993 | Hartlepp |
| 5,419,457 | A | | 5/1995 | Ross et al. |
| 5,460,271 | A | * | 10/1995 | Kenny ............... B65G 47/1492 198/453 |
| 5,495,097 | A | | 2/1996 | Katz et al. |
| 5,628,408 | A | | 5/1997 | Planke et al. |
| 5,713,473 | A | | 2/1998 | Satake et al. |
| 5,794,788 | A | | 8/1998 | Massen |
| 5,839,566 | A | | 11/1998 | Bonnet |
| 5,875,434 | A | | 2/1999 | Matsuoka et al. |
| 6,011,998 | A | | 1/2000 | Lichti et al. |
| 6,059,092 | A | | 5/2000 | Jerue et al. |
| 6,060,677 | A | | 5/2000 | Ulrichsen et al. |
| 6,079,570 | A | | 6/2000 | Oppliger et al. |
| 6,087,608 | A | | 7/2000 | Schlichter et al. |
| 6,131,372 | A | * | 10/2000 | Pruett .................... B65B 23/12 53/448 |
| 6,208,908 | B1 | | 3/2001 | Boyd et al. |
| 6,246,023 | B1 | | 6/2001 | Kugle |
| 6,323,452 | B1 | | 11/2001 | Bonnet |
| 6,401,936 | B1 | | 6/2002 | Isaacs et al. |
| 6,505,093 | B1 | | 1/2003 | Thatcher et al. |
| 6,579,053 | B1 | | 6/2003 | Grams et al. |
| 6,685,031 | B2 | | 2/2004 | Takizawa |
| 6,688,459 | B1 | | 2/2004 | Bonham et al. |
| 6,705,528 | B2 | | 3/2004 | Good et al. |
| 6,762,382 | B1 | * | 7/2004 | Danelski ............... B65G 17/002 209/912 |
| 6,779,647 | B1 | * | 8/2004 | Nagler .................. B65G 43/08 198/395 |
| 7,728,244 | B2 | | 6/2010 | De Leo et al. |
| 8,662,314 | B2 | | 3/2014 | Jones et al. |
| 8,718,814 | B1 | | 5/2014 | Clark et al. |
| 8,776,694 | B2 | | 7/2014 | Rosenwinkel et al. |
| 8,798,784 | B1 | * | 8/2014 | Clark ...................... G06F 7/00 700/214 |
| 8,811,722 | B2 | * | 8/2014 | Perez Cortes .......... G06T 15/08 600/117 |
| 8,972,049 | B2 | * | 3/2015 | Tidhar .................... B65B 5/103 700/240 |
| 8,997,438 | B1 | | 4/2015 | Fallas |
| 9,102,336 | B2 | * | 8/2015 | Rosenwinkel ....... H04B 10/114 |
| 9,111,251 | B1 | | 8/2015 | Brazeau |
| 9,346,083 | B2 | | 5/2016 | Stone |
| 9,364,865 | B2 | | 6/2016 | Kim et al. |
| 9,481,518 | B2 | | 11/2016 | Neiser |
| 9,486,926 | B2 | * | 11/2016 | Kawano .................. B25J 15/06 |
| 9,492,923 | B2 | | 11/2016 | Wellman et al. |
| 9,555,447 | B2 | * | 1/2017 | Lykkegaard ............ B07C 5/02 |
| 9,751,693 | B1 | | 9/2017 | Battles et al. |
| 9,878,349 | B2 | | 1/2018 | Crest et al. |
| 9,926,138 | B1 | | 3/2018 | Brazeau et al. |
| 9,931,673 | B2 | | 4/2018 | Nice et al. |
| 9,937,532 | B2 | | 4/2018 | Wagner et al. |

(56) References Cited

U.S. PATENT DOCUMENTS

| | | | |
|---|---|---|---|
| 9,962,743 B2 | 5/2018 | Bombaugh et al. | |
| 9,975,148 B2 | 5/2018 | Zhu et al. | |
| 10,058,896 B2 | 8/2018 | Hicham et al. | |
| 10,538,394 B2 | 1/2020 | Wagner et al. | |
| 10,792,706 B2* | 10/2020 | Wagner | B07C 3/08 |
| 10,815,068 B2 | 10/2020 | Daboub | |
| 10,913,614 B2 | 2/2021 | Wagner et al. | |
| 10,913,615 B2 | 2/2021 | Wagner et al. | |
| 11,492,210 B2 | 11/2022 | Wagner et al. | |
| 2002/0026768 A1* | 3/2002 | Duncan | B65B 25/008 209/583 |
| 2002/0092801 A1 | 7/2002 | Dominguez | |
| 2002/0147568 A1 | 10/2002 | Wenzel et al. | |
| 2002/0157919 A1 | 10/2002 | Sherwin | |
| 2002/0179502 A1 | 12/2002 | Cerutti et al. | |
| 2003/0006122 A1 | 1/2003 | Street et al. | |
| 2003/0034281 A1 | 2/2003 | Kumar | |
| 2003/0038065 A1 | 2/2003 | Pippin et al. | |
| 2003/0042112 A1 | 3/2003 | Woerner et al. | |
| 2004/0065597 A1 | 4/2004 | Hanson | |
| 2004/0144618 A1 | 7/2004 | McDonald et al. | |
| 2004/0261366 A1 | 12/2004 | Gillet et al. | |
| 2006/0045672 A1* | 3/2006 | Maynard | B65G 1/0435 414/276 |
| 2007/0209976 A1 | 9/2007 | Worth et al. | |
| 2008/0046116 A1 | 2/2008 | Khan et al. | |
| 2008/0181753 A1 | 7/2008 | Bastian et al. | |
| 2010/0122942 A1 | 5/2010 | Harres et al. | |
| 2010/0318216 A1 | 12/2010 | Faivre et al. | |
| 2011/0144798 A1 | 6/2011 | Freudelsperger | |
| 2011/0154784 A1* | 6/2011 | Poutot | B65B 43/285 53/247 |
| 2011/0238207 A1 | 9/2011 | Bastian, II et al. | |
| 2011/0243707 A1 | 10/2011 | Dumas et al. | |
| 2011/0320036 A1 | 12/2011 | Freudelsperger | |
| 2012/0118699 A1 | 5/2012 | Buchmann et al. | |
| 2013/0051696 A1* | 2/2013 | Garrett | G01W 1/14 382/254 |
| 2013/0110280 A1* | 5/2013 | Folk | B25J 9/1697 700/215 |
| 2013/0202195 A1 | 8/2013 | Perez Cortes et al. | |
| 2014/0067127 A1 | 3/2014 | Gotou | |
| 2014/0086714 A1 | 3/2014 | Malik | |
| 2014/0166549 A1 | 6/2014 | Ito et al. | |
| 2014/0244026 A1 | 8/2014 | Neiser | |
| 2014/0277693 A1 | 9/2014 | Naylor | |
| 2014/0291112 A1 | 10/2014 | Lyon et al. | |
| 2014/0332344 A1* | 11/2014 | Jodoin | B65G 47/71 198/448 |
| 2014/0360924 A1 | 12/2014 | Smith et al. | |
| 2014/0364998 A1* | 12/2014 | Neiser | B65G 43/08 700/230 |
| 2015/0057793 A1 | 2/2015 | Kawano | |
| 2015/0081090 A1 | 3/2015 | Dong | |
| 2015/0114799 A1 | 4/2015 | Hansl et al. | |
| 2015/0134110 A1* | 5/2015 | Koyanagi | B65G 47/46 700/248 |
| 2015/0283586 A1 | 10/2015 | Dante et al. | |
| 2015/0306634 A1 | 10/2015 | Maeda et al. | |
| 2015/0346708 A1 | 12/2015 | Mattern et al. | |
| 2015/0375880 A1* | 12/2015 | Ford | B65B 11/105 53/147 |
| 2016/0075521 A1 | 3/2016 | Puchwein et al. | |
| 2016/0096694 A1 | 4/2016 | Baylor et al. | |
| 2016/0167227 A1 | 6/2016 | Wellman et al. | |
| 2016/0176638 A1 | 6/2016 | Toebes | |
| 2016/0176656 A1 | 6/2016 | Lang | |
| 2016/0199884 A1* | 7/2016 | Lykkegaard | G05B 19/4182 700/223 |
| 2016/0221762 A1 | 8/2016 | Schroader | |
| 2016/0228921 A1 | 8/2016 | Doublet et al. | |
| 2016/0244262 A1 | 8/2016 | O'Brien et al. | |
| 2016/0347545 A1 | 12/2016 | Lindbo et al. | |
| 2017/0021499 A1 | 1/2017 | Wellman et al. | |
| 2017/0024896 A1 | 1/2017 | Houghton et al. | |
| 2017/0043953 A1 | 2/2017 | Battles et al. | |
| 2017/0066594 A1* | 3/2017 | Milo | B65G 11/023 |
| 2017/0066597 A1 | 3/2017 | Hiroi | |
| 2017/0080566 A1 | 3/2017 | Stubbs et al. | |
| 2017/0106532 A1 | 4/2017 | Wellman et al. | |
| 2017/0121113 A1 | 5/2017 | Wagner et al. | |
| 2017/0136632 A1 | 5/2017 | Wagner et al. | |
| 2017/0157648 A1 | 6/2017 | Wagner et al. | |
| 2017/0157649 A1 | 6/2017 | Wagner et al. | |
| 2017/0173638 A1 | 6/2017 | Wagner et al. | |
| 2017/0225330 A1 | 8/2017 | Wagner et al. | |
| 2017/0312789 A1* | 11/2017 | Schroader | B07C 5/10 |
| 2017/0349385 A1 | 12/2017 | Moroni et al. | |
| 2017/0369244 A1* | 12/2017 | Battles | B65G 27/04 |
| 2018/0056333 A1* | 3/2018 | Hicham | B07C 1/04 |
| 2018/0127219 A1 | 5/2018 | Wagner et al. | |
| 2018/0148272 A1 | 5/2018 | Wagner et al. | |
| 2018/0330134 A1 | 11/2018 | Wagner et al. | |

FOREIGN PATENT DOCUMENTS

| | | | |
|---|---|---|---|
| CN | 102390701 A | 3/2012 | |
| CN | 104507814 A | 4/2015 | |
| CN | 104743367 A | 7/2015 | |
| CN | 204714016 U | 10/2015 | |
| CN | 105905019 A | 8/2016 | |
| CN | 205500186 U | 8/2016 | |
| CN | 205701476 U | 11/2016 | |
| CN | 106540883 A | 3/2017 | |
| CN | 108602630 A | 9/2018 | |
| DE | 19510392 A1 | 9/1996 | |
| DE | 102004001181 A1 | 8/2005 | |
| DE | 10133805 B4 | 9/2005 | |
| DE | 102004013353 A1 | 10/2005 | |
| DE | 102005061309 A1 | 7/2007 | |
| DE | 102007023909 A1 | 11/2008 | |
| DE | 102007028680 A1 * | 12/2008 | B25J 17/0266 |
| DE | 102007028680 A1 | 12/2008 | |
| DE | 102007038834 A1 | 2/2009 | |
| DE | 102010002317 A1 | 8/2011 | |
| DE | 102012003160 A1 | 9/2012 | |
| DE | 102012102333 A1 | 9/2013 | |
| DE | 102014111396 A1 | 2/2016 | |
| EP | 0613841 A1 | 9/1994 | |
| EP | 0648695 A2 | 4/1995 | |
| EP | 1995192 A2 | 11/2008 | |
| EP | 2511653 A1 | 10/2012 | |
| EP | 2233400 B1 | 5/2013 | |
| EP | 2650237 A1 | 10/2013 | |
| EP | 2823899 A1 | 1/2015 | |
| EP | 3006379 A2 | 4/2016 | |
| EP | 3112295 A1 | 1/2017 | |
| FR | 1457450 A | 1/1966 | |
| FR | 2832654 A1 | 5/2003 | |
| GB | 2084531 A | 4/1982 | |
| GB | 2507707 A | 5/2014 | |
| JP | S54131278 A | 10/1979 | |
| JP | S63310406 A | 12/1988 | |
| JP | 2002028577 A | 1/2002 | |
| JP | 2002175543 A | 6/2002 | |
| JP | 2007182286 A | 7/2007 | |
| JP | 2008037567 A | 2/2008 | |
| JP | 2011213431 A | 10/2011 | |
| JP | 2014141313 A | 8/2014 | |
| WO | 03074201 A1 | 9/2003 | |
| WO | 2007009136 A1 | 1/2007 | |
| WO | 2008091733 A2 | 7/2008 | |
| WO | 2009021650 A1 | 2/2009 | |
| WO | 2010017872 A1 | 2/2010 | |
| WO | 2010034044 A1 | 4/2010 | |
| WO | 2010099873 A1 | 9/2010 | |
| WO | 2011038442 A2 | 4/2011 | |
| WO | 2012024714 A2 | 3/2012 | |
| WO | 2014064592 A2 | 5/2014 | |
| WO | 2014166650 A1 | 10/2014 | |
| WO | 2015035300 A1 | 3/2015 | |
| WO | 2015118171 A1 | 8/2015 | |
| WO | 2015162390 A1 | 10/2015 | |

(56) References Cited

FOREIGN PATENT DOCUMENTS

| WO | 2016067163 A1 | 5/2016 |
| WO | 2016100235 A1 | 6/2016 |
| WO | 2016102822 A1 | 6/2016 |
| WO | 2017044747 A1 | 3/2017 |
| WO | 2018017616 A1 | 1/2018 |

OTHER PUBLICATIONS

Third Office Action (along with its English translation) issued by the China National Intellectual Property Administration in related Chinese Patent Application No. 201780073538.7 dated Sep. 16, 2021, 16 pages.
Fourth Office Action issued by the National Intellectual Property Administration, P.R.C in related Chinese Patent Application No. 201780073538.7 dated Mar. 2, 2022, 17 pages.
Communication pursuant to Article 94(3) EPC issued by the European Patent Office in related European Patent Application No. 17817490.0 dated Jun. 8, 2022, 6 pages.
Notice of Second Office Action and Second Office Action (along with its English translation) issued by the China National Intellectual Property Administration in related Chinese Patent Application No. 201780073538.7 dated Mar. 11, 2021, 10 pages.
Examiner's Report issued by the Innovation, Science and Economic Development Canada in related Canadian Patent Application No. 3,061,181 dated Aug. 8, 2022, 4 pages.
Examiner's Report issued by the Innovation, Science and Economic Development Canada in related Canadian Patent Application No. 3,061,181 dated Jul. 7, 2021, 5 pages.
Notice of First Office Action and First Office Action (along with its English translation) issued by the China National Intellectual Property Administration in related Chinese Patent Application No. 201880038515.7 dated Oct. 21, 2020, 19 pages.
International Search Report and Written Opinion issued by the International Searching Authority in related International Application No. PCT/US2017/063382 dated Apr. 30, 2018, 16 pages.
International Preliminary Report on Patentability dated Jun. 6, 2019 in related PCT Application No. PCT/US2017/063382, 10 pages.
International Search Report and Written Opinion issued in International Patent Application No. PCT/US2018/029114 dated Aug. 6, 2018, 13 pages.
International Preliminary Report on Patentability dated Oct. 29, 2019 in related PCT Application No. PCT/US2018/029114, 9 pages.
Communication pursuant to Rules 161(1) and 162 EPC for European Patent Application No. 17817490.0 issued by the European Patent Office dated Jul. 5, 2019, 3 pages.
Klingbeil et al., "Grasping with Application to an Autonomous Checkout Robot," Robotics and Automation (ICRA), 2011 IEEE International Conference On IEEE, Jun. 2011, 9 pages.
Non-Final Office Action issued by the U.S. Patent and Trademark Office dated Jul. 19, 2019, in related U.S. Appl. No. 15/824,009, 13 pages.
Non-Final Office Action issued by the U.S. Patent and Trademark Office dated Jun. 27, 2019, in related U.S. Appl. No. 15/961,294, 24 pages.
Communication pursuant to Rules 161(1) and 162 EPC for European Patent Application No. 18724053.6 issued by the European Patent Office dated Dec. 3, 2019, 3 pages.
Final Office Action issued by the U.S. Patent and Trademark Office dated Jan. 16, 2020, in related U.S. Appl. No. 15/961,294, 23 pages.
Rembold, Derk, Vladislav Belogroudov, and H. Worn. "Object turning for barcode search." In Proceedings. 2000 IEEE/RSJ International Conference on Intelligent Robots and Systems (IROS 2000)(Cat. No. 00CH37113), vol. 2, pp. 1267-1272. IEEE, 2000.
Cipolla, Roberto, and Nick Hollinghurst. "Visually guided grasping in unstructured environments." Robotics and Autonomous Systems 19, No. 3-4 (1997): 337-346.
Non-Final Office Action issued by the U.S. Patent and Trademark Office dated May 12, 2020, in related U.S. Appl. No. 16/703,589, 10 pages.
Non-Final Office Action issued by the U.S. Patent and Trademark Office dated May 12, 2020, in related U.S. Appl. No. 16/703,540, 10 pages.
Examiner's Report issued by the Innovation, Science and Economic Development Canada in related Canadian Patent Application No. 3,045,115 dated Jul. 10, 2020, 4 pages.
First Office Action issued by the National Intellectual Property Administration, P.R.C in related Chinese Patent Application No. 201780073538.7 dated Jul. 23, 2020, 8 pages.
Non-Final Office Action issued by the United States Patent and Trademark Office in related U.S. Appl. No. 17/124,992 dated Mar. 8, 2022, 14 pages.
Decision on Rejection, and its English translation, issued by the National Intellectual Property Administration, P.R.C in related Chinese Patent Application No. 201780073538.7 dated Jul. 4, 2022, 12 pages.
Communication pursuant to Article 94(3) EPC issued by the European Patent Office in related European Patent Application No. 18724053.6 dated Jul. 13, 2022, 3 pages.
Examiner's Report issued by the Innovation, Science and Economic Development Canada in related Canadian Patent Application No. 3,061,181 dated Feb. 2, 2021, 5 pages.
Non-Final Office Action issued by the United States Patent and Trademark Office in related U.S. Appl. No. 17/950,892 dated Jan. 12, 2023, 12 pages.
Notice on the First Office Action issued by the China National Intellectual Property Administration in related Chinese Patent Application No. 202210314834.4 dated Mar. 30, 2023, 12 pages.

* cited by examiner

SYSTEMS AND METHODS FOR PROVIDING SINGULATION OF OBJECTS FOR PROCESSING USING OBJECT MOVEMENT REDISTRIBUTION

PRIORITY

The present application is a continuation of U.S. patent application Ser. No. 15/961,294, filed Apr. 24, 2018, now U.S. Pat. No. 10,792,706, issued Oct. 6, 2020, which claims priority to U.S. Provisional Patent Application Ser. No. 62/489,121, filed Apr. 24, 2017, the disclosures of which are hereby incorporated by reference in their entireties.

BACKGROUND

The invention generally relates to automated, robotic and other processing systems, and relates in particular to automated and robotic systems intended for use in environments requiring, for example, that a variety of objects (e.g., articles, parcels or packages) be processed, e.g., sorted and/or otherwise distributed to several output destinations.

Many object distribution systems receive objects in a disorganized stream that may be provided as individual objects or objects aggregated in groups such as in bags, arriving on any of several different conveyances, commonly a conveyor, a truck, a pallet, a Gaylord, or a bin. Each object must then be distributed to the correct destination container, as determined by identification information associated with the object, which is commonly determined by a label printed on the object. The destination container may take many forms, such as a bag or a bin.

The processing of such objects has traditionally been done, at least in part, by human workers that scan the objects, e.g., with a hand-held barcode scanner, and then place the objects at assigned locations. For example many order fulfillment operations achieve high efficiency by employing a process called wave picking. In wave picking, orders are picked from warehouse shelves and placed at locations (e.g., into bins) containing multiple orders that are sorted downstream. At the processing stage individual objects are identified, and multi-object orders are consolidated, for example into a single bin or shelf location, so that they may be packed and then shipped to customers. The processing (e.g., sorting) of these objects has traditionally been done by hand. A human sorter picks an object from an incoming bin, finds a barcode on the object, scans the barcode with a handheld barcode scanner, determines from the scanned barcode the appropriate bin or shelf location for the article, and then places the article in the so-determined bin or shelf location where all objects for that order have been defined to belong. Automated systems for order fulfillment have also been proposed. See for example, U.S. Patent Application Publication No. 2014/0244026, which discloses the use of a robotic arm together with an arcuate structure that is movable to within reach of the robotic arm.

Other ways of identifying objects by code scanning either require manual processing, or require that the code location be controlled or constrained so that a fixed or robot-held code scanner (e.g., barcode scanner) can reliably detect it. Manually operated barcode scanners are generally either fixed or handheld systems. With fixed systems, such as those used at point-of-sale systems, the operator holds the object and places it in front of the scanner so that the barcode faces the scanning device's sensors, and the scanner, which scans continuously, decodes any barcodes that it can detect. If the object is not immediately detected, the person holding the object typically needs to vary the position or rotation of the object in front of the fixed scanner, so as to make the barcode more visible to the scanner. For handheld systems, the person operating the scanner looks for the barcode on the object, and then holds the scanner so that the object's barcode is visible to the scanner, and then presses a button on the handheld scanner to initiate a scan of the barcode.

Further, many current distribution center sorting systems generally assume an inflexible sequence of operations whereby a disorganized stream of input objects is first singulated into a single stream of isolated objects presented one at a time to a scanner that identifies the object. A conveyance element or elements (e.g., a conveyor, a tilt tray, or manually movable bins) transport the objects to the desired destination or further processing station, which may be a bin, a chute, a bag or a conveyor, etc.

In conventional parcel sortation systems, human workers or automated systems typically retrieve objects in an arrival order, and sort each object into a collection bin based on a set of given heuristics. For instance, all objects of like type might go to a collection bin, or all objects in a single customer order, or all objects destined for the same shipping destination, etc. The human workers or automated systems are required to receive objects and to move each to their assigned collection bin. If the number of different types of input (received) objects is large, a large number of collection bins is required.

Such a system has inherent inefficiencies as well as inflexibilities since the desired goal is to match incoming objects to assigned collection bins. Such systems may require a large number of collection bins (and therefore a large amount of physical space, large capital costs, and large operating costs) in part, because sorting all objects to all destinations at once is not always most efficient.

Current state-of-the-art sortation systems rely on human labor to some extent. Most solutions rely on a worker that is performing sortation, by scanning an object from an induction area (chute, table, etc.) and placing the object in a staging location, conveyor, or collection bin. When a bin is full, another worker empties the bin into a bag, box, or other container, and sends that container on to the next processing step. Such a system has limits on throughput (i.e., how fast can human workers sort to or empty bins in this fashion) and on number of diverts (i.e., for a given bin size, only so many bins may be arranged to be within efficient reach of human workers).

Other partially automated sortation systems involve the use of recirculating conveyors and tilt trays, where the tilt trays receive objects by human sortation (human induction), and each tilt tray moves past a scanner. Each object is then scanned and moved to a pre-defined location assigned to the object. The tray then tilts to drop the object into the location. Further, partially automated systems, such as the bomb-bay style recirculating conveyor, involve having trays open doors on the bottom of each tray at the time that the tray is positioned over a predefined chute, and the object is then dropped from the tray into the chute. Again, the objects are scanned while in the tray, which assumes that any identifying code is visible to the scanner.

Such partially automated systems are lacking in key areas. As noted, these conveyors have discrete trays that can be loaded with an object; they then pass through scan tunnels that scan the object and associate it with the tray in which it is riding. When the tray passes the correct bin, a trigger mechanism causes the tray to dump the object into the bin. A drawback with such systems however, is that every divert requires an actuator, which increases the mechanical complexity and the cost per divert can be very high.

An alternative is to use human labor to increase the number of diverts, or collection bins, available in the system. This decreases system installation costs, but increases the operating costs. Multiple cells may then work in parallel, effectively multiplying throughput linearly while keeping the number of expensive automated diverts at a minimum. Such diverts do not ID an object and cannot divert it to a particular spot, but rather they work with beam breaks or other sensors to seek to ensure that indiscriminate bunches of objects get appropriately diverted. The lower cost of such diverts coupled with the low number of diverts keep the overall system divert cost low.

Unfortunately, these systems don't address the limitations to total number of system bins. The system is simply diverting an equal share of the total objects to each parallel manual cell. Thus each parallel sortation cell must have all the same collection bins designations; otherwise an object might be delivered to a cell that does not have a bin to which that object is mapped. There remains a need for a more efficient and more cost effective object sortation system that sorts objects of a variety of sizes and weights into appropriate collection bins or trays of fixed sizes, yet is efficient in handling objects of such varying sizes and weights.

SUMMARY

In accordance with an embodiment, the invention provides a processing system including a singulation system. The singulation system includes a conveying system for moving objects to be processed from a source area along a first direction, a detection system for detecting objects at the conveying system, and for selecting certain selected objects for redistribution on the conveying system, and a movement redistribution system for redistributing the certain selected objects on the conveying system for providing a singulated stream of objects.

In accordance with another embodiment, the invention provides a singulation system including a conveying system for moving objects to be sorted from a source area along a first direction, a selection system for selecting certain selected objects for redistribution on the conveying system, and a movement redistribution system for redistributing the certain selected objects on the conveying system and by returning the certain selected objects to an earlier stage of the conveying system such that a singulated stream of objects may be provided to an object processing system.

In accordance with a further embodiment, the invention provides a method of providing singulation of objects. The method includes the steps of moving objects to be sorted from a source area along a first direction of a conveying system, detecting objects at the conveying system, selecting certain selected objects for redistribution on the conveying system, and redistributing the certain selected objects on the conveying system to provide a singulated stream of objects.

BRIEF DESCRIPTION OF THE DRAWINGS

The following description may be further understood with reference to the accompanying drawings in which.

Figure 1:
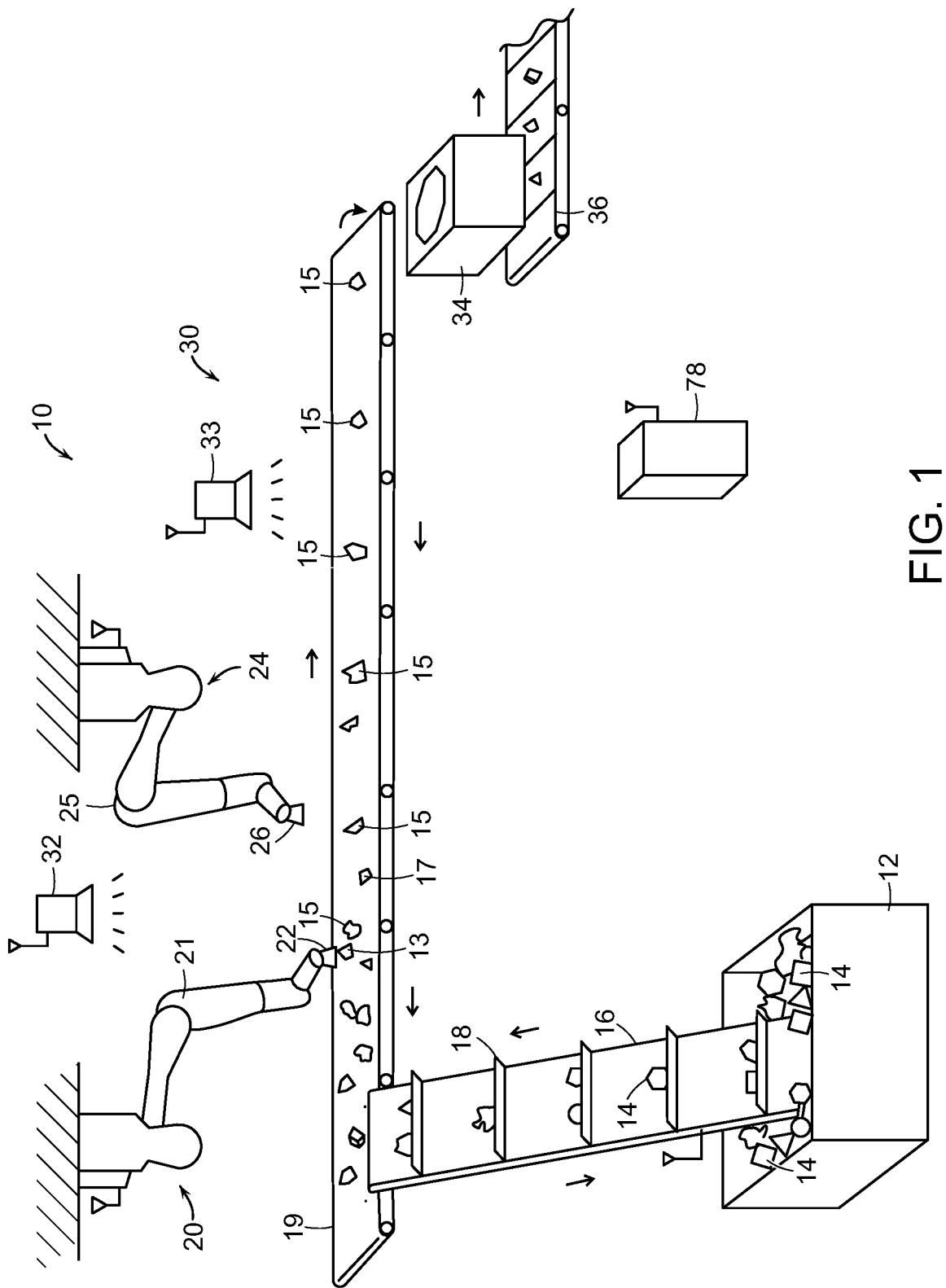
FIG. 1 shows an illustrative diagrammatic view of an object singulation processing system in accordance with an embodiment of the present invention.

The drawings are shown for illustrative purposes only.

DETAILED DESCRIPTION

In accordance with an embodiment, the invention provides a processing system that includes an input system for receiving a wide variety of objects to be processed, and a singulation system for providing a singulated stream of objects for efficient processing of the objects. In further embodiments, the system may include an identification system for identifying objects, and an output system for providing the singulated stream of objects at desired output destinations. Individual parcels need to be identified and conveyed to desired parcel-specific locations. The described systems reliably automate the identification and conveyance of such parcels, employing in certain embodiments, a set of conveyors and sensors and a robot arm. In short, applicants have discovered that when automating sortation of objects, there are a few main things to consider: 1) the overall system throughput (parcels sorted per hour), 2) the number of diverts (i.e., number of discrete locations to which an object can be routed), 3) the total area of the sortation system (square feet), and 4) the annual costs to run the system (man-hours, electrical costs, cost of disposable components).

Processing objects in a distribution center (e.g., sorting or order fulfillment) are applications for automatically identifying and moving objects. In a shipping distribution center for example, objects commonly arrive in trucks, are conveyed to sortation stations where they are processed (e.g., sorted) according to desired destinations, aggregated in bags, and then loaded in trucks for transport to the desired destinations. Another application would be in the shipping department of a retail store or order fulfillment center, which may require that objects be processed for transport to different shippers, or to different distribution centers of a particular shipper. In a shipping or distribution center the objects may take form of plastic bags, boxes, tubes, envelopes, or any other suitable container, and in some cases may also include objects not in a container. In a shipping or distribution center the desired destination is commonly obtained by reading identifying information printed on the object or on an attached label. In this scenario the destination corresponding to identifying information is commonly obtained by querying the customer's information system. In other scenarios the destination may be written directly on the object, or may be known through other means.

In accordance with various embodiments, therefore, the invention provides a method of taking individual objects from a disorganized stream of objects, providing a singulated stream of objects, identifying individual objects, and processing them to desired destinations. The invention further provides methods for loading objects into the system, for conveying objects from one point to the next, for excluding inappropriate or unidentifiable objects, for grasping objects, for determining grasp locations, for determining robot motion trajectories, for transferring objects from one conveyor to another, for aggregating parcels and transferring to output conveyors, for digital communication within the system and with outside information systems, for communication with human operators and maintenance staff, and for maintaining a safe environment.

Important components of an automated object identification and processing system, in accordance with an embodiment of the present invention, as shown in FIG. 1. FIG. 1 shows a system 10 that includes an infeed hopper 12 into which objects 14 may be dumped, e.g., by a dumper or transferred from a Gaylord. An infeed conveyor 16 conveys objects from the infeed hopper 12 to a primary conveyor 19. The infeed conveyor 16 may include cleats 18 for assisting in lifting the objects 14 from the hopper 12 onto the primary conveyor 19. Primary perception system 32 surveys the objects 14 to identify objects when possible, to determine good grasp points, and to select certain objects for repositioning on the conveyor 19 in accordance with various embodiments of the invention.

The system also includes one or more programmable motion systems 20, 24 such as robotic arms 21, 25, each of which includes a gripper 22, 26 for gripping objects 14. Each robotic arm may be equipped with sensors and computing, that when combined is assumed herein to exhibit the following capabilities: (a) it is able to pick objects up from a stream of (e.g., non-singulated) objects; (b) it is able to move the object to arbitrary places within its workspace; and, (c) it is able to generate a map of objects that it is able to pick, represented as a candidate set of grasp points in the workcell, and as a list of polytopes enclosing the object in space. The allowable objects are determined by the capabilities of the robotic system. Their size, weight and geometry are assumed to be such that the robotic system is able to pick, move and place them.

Figure 2:
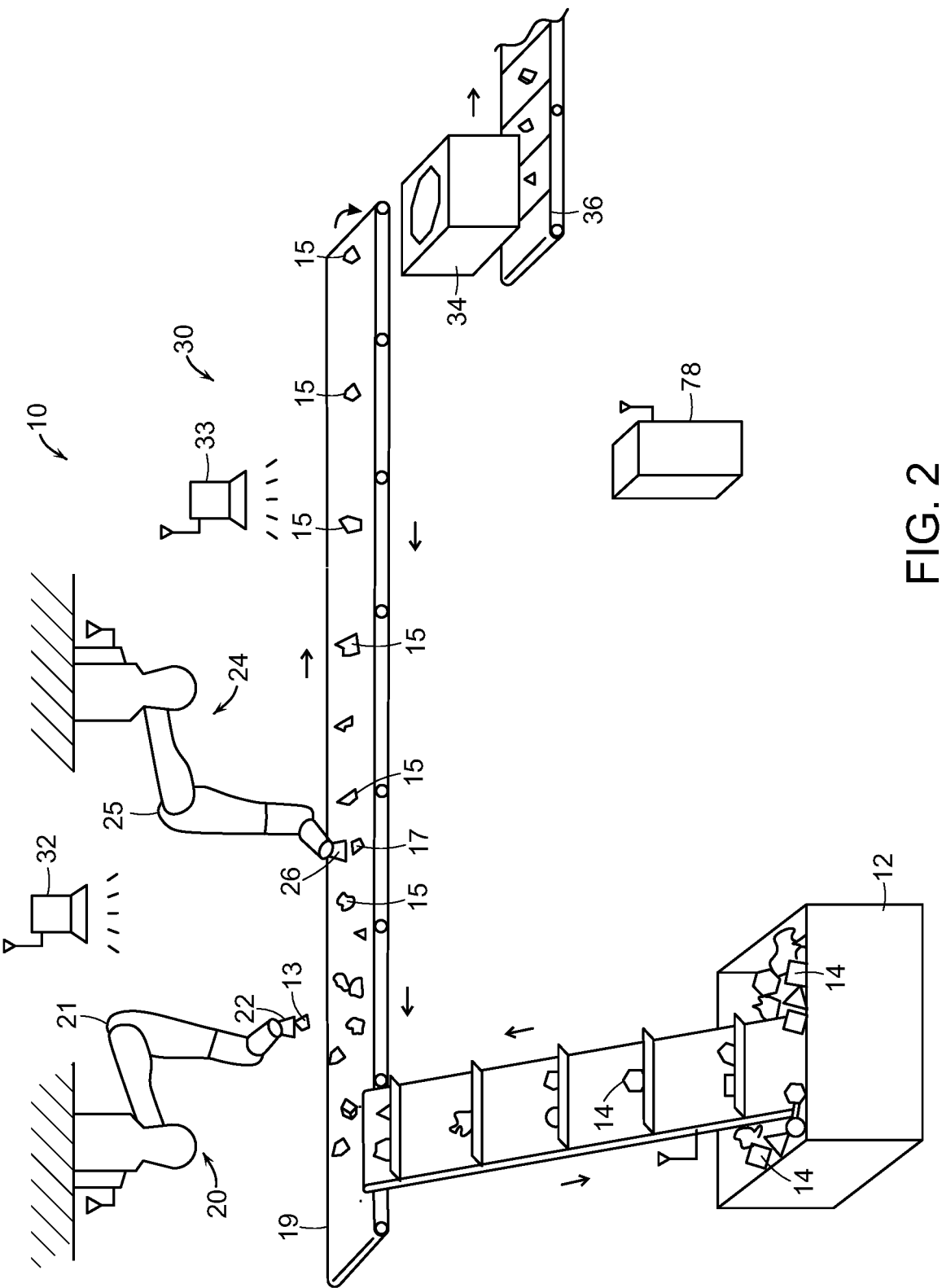
FIG. 2 shows an illustrative diagrammatic view of the object singulation processing system of FIG. 1 at later point in time.
Figure 3:
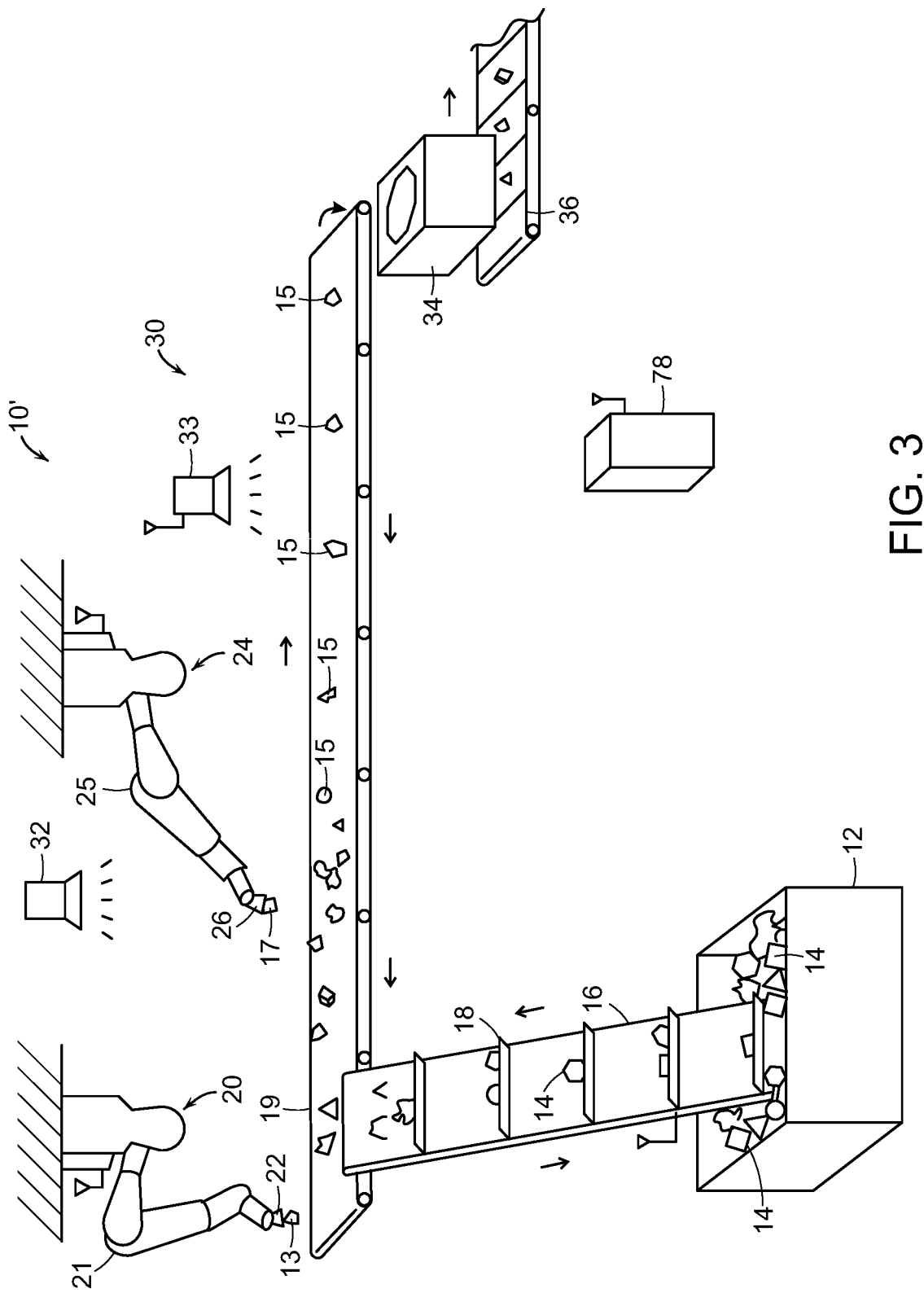
FIG. 3 shows an illustrative diagrammatic view of the object singulation processing system of FIG. 1 at a further later point in time.

With further reference to FIGS. 2 and 3, the robotic arms 21, 25 are used to move objects either to the beginning of the conveyor 19, or to positions that will provide a singulated stream of objects 15. For example, FIGS. 1-3 show that an object 13 may be picked up by the robotic arm 21 and moved to an upstream portion of the conveyor 19, and show that an object 17 may be picked up by the other robotic arm 25 and also moved to an upstream portion of the conveyor 19. The movement of the objects 13, 17 provides a singulated stream of objects 15 by removing selected objects and returning the objects to an upstream portion of the conveyor.

Significantly, a singulated stream of objects 15 is provided (as shown at 30), and this singulated stream of objects may be monitored by a perception system 33, and may be delivered to an identification system 34 (such as a drop perception system as discussed below) as a singulated stream and without requiring that a robotic system place objects into the drop perception system. Objects may then fall through the system 34 onto, for example, a conveyor system 36, for further processing as discussed below. By providing a singulated stream of objects for processing, the system is able to more effectively control the object processing rate, and reduce the incidence of errors that may occur, for example if two objects in close contact with each other are perceived as being one object. The infeed conveyor 16 may also be in communication with the controller 78 and the robotic arm 24, and the speed of the infeed conveyor 16 may be adjusted to either slow down if moving too fast, or speed up if system determines that more bandwidth exists for a faster input. The speed and direction of the conveyor 19 may also be adjusted as may be necessary to provide the singulate stream of objects.

Figure 4:
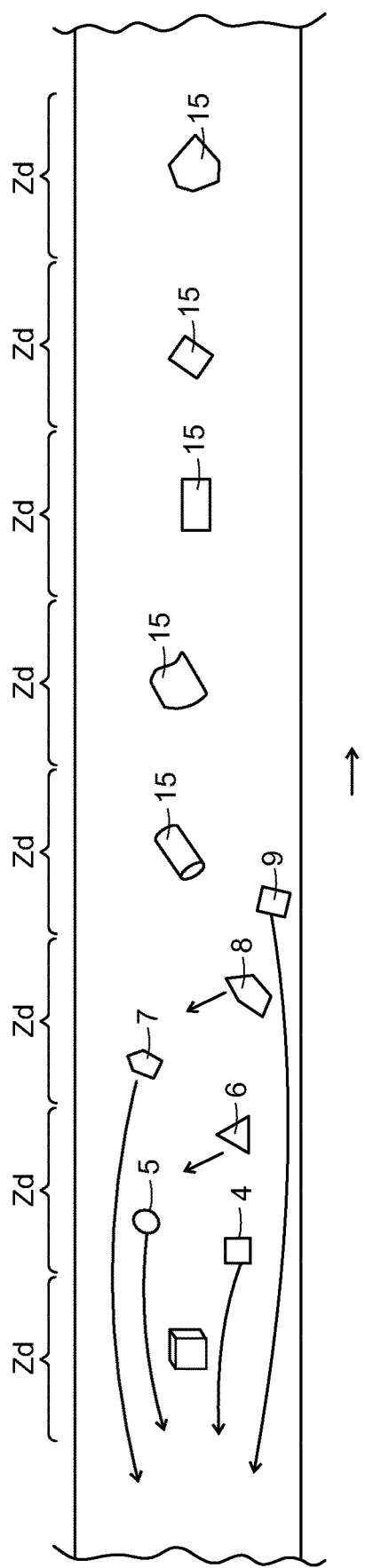
FIG. 4 shows an illustrative diagrammatic view of the processing conveyor of FIG. 1.

As further shown in FIG. 4, the system may monitor the movement of the conveyor 19, enabling the system to maintain dynamic information regarding divided areas or zones of a defined distance ($Z_d$) such that the singulated stream of objects is provided with one object 15 per area $Z_d$. This may be achieved, for example, by moving objects 9, 7, 5 and 4 to upstream positions on the conveyor and may include moving objects 8, 6 to locations that are more central to a respective area $Z_d$. In certain embodiments and applications, the system may move objects to downstream positions on the conveyor in the process of providing a singulated stream of objects.

Figure 5:
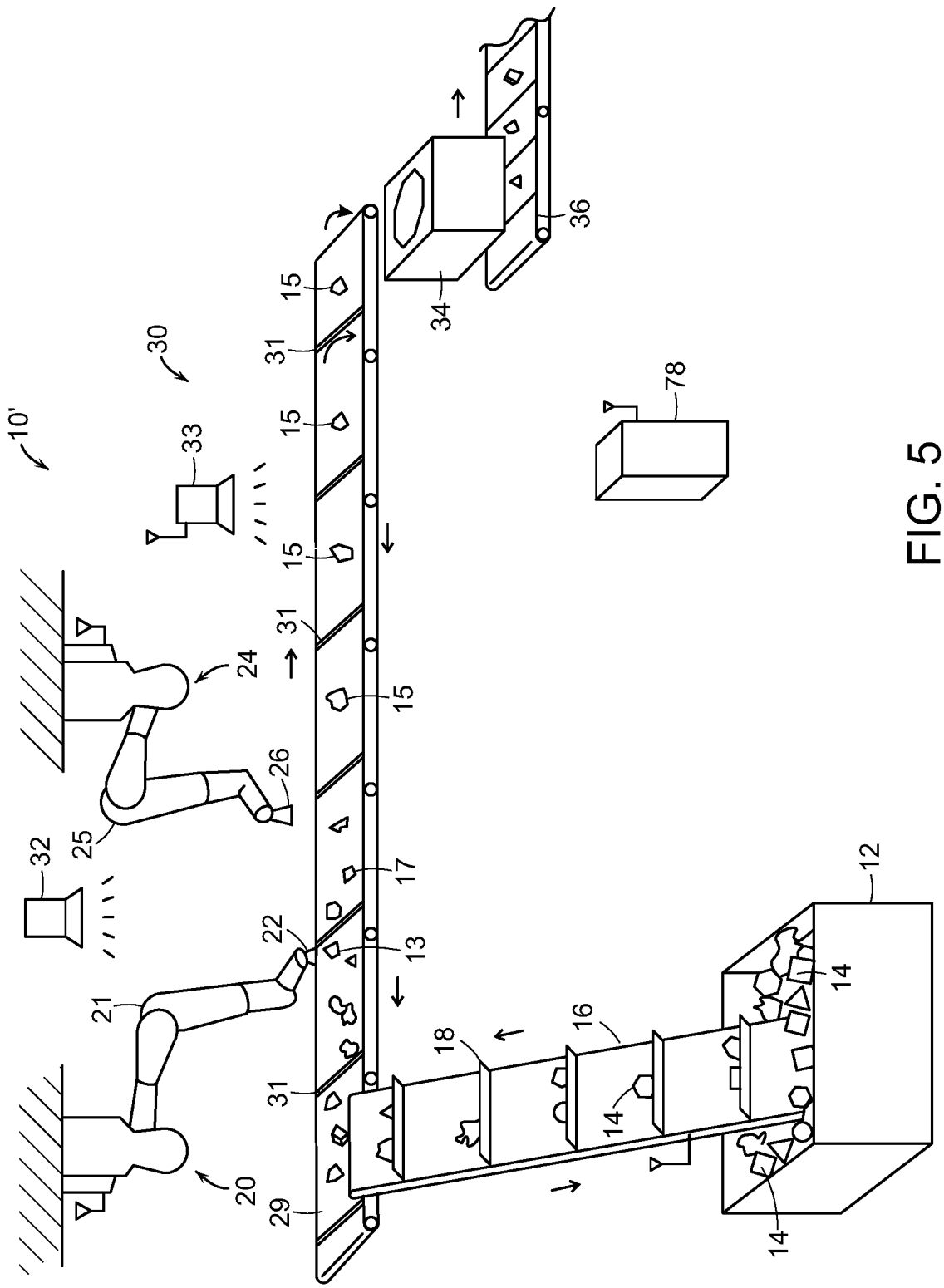
FIG. 5 shows an illustrative diagrammatic view of an object processing system in accordance with another embodiment of the present invention.

As further shown in FIG. 5, a system 10' of another embodiment of the invention may include a primary conveyor 29 with cleats 31. The cleats may, for example, define the divided areas or zones such that when the singulated stream of objects 15 is provided, it is provided with one object positioned within each cleated area. The primary conveyor 29 is otherwise similar to and functions like primary conveyor 19 of FIGS. 1-4, and the cleats 31 may be similar to the cleats 18 of the infeed conveyor 16. The remaining elements of the system of FIG. 5 are the same as those of FIGS. 1, 2 and 3 and bear the same reference numerals.

The correct processing destination is determined from the symbol (e.g., barcode) on the object. It is assumed that the objects are marked in one or more places on their exterior with a visually distinctive mark such as a barcode or radio-frequency identification (RFID) tag so that they may be identified with a scanner. The type of marking depends on the type of scanning system used, but may include 1D or 2D barcode symbologies. Multiple symbologies or labeling approaches may be employed. The types of scanners employed are assumed to be compatible with the marking approach. The marking, either by barcode, RFID tag, or other means, encodes a symbol string, which is typically a string of letters and numbers, that identifies the object.

Figure 6:
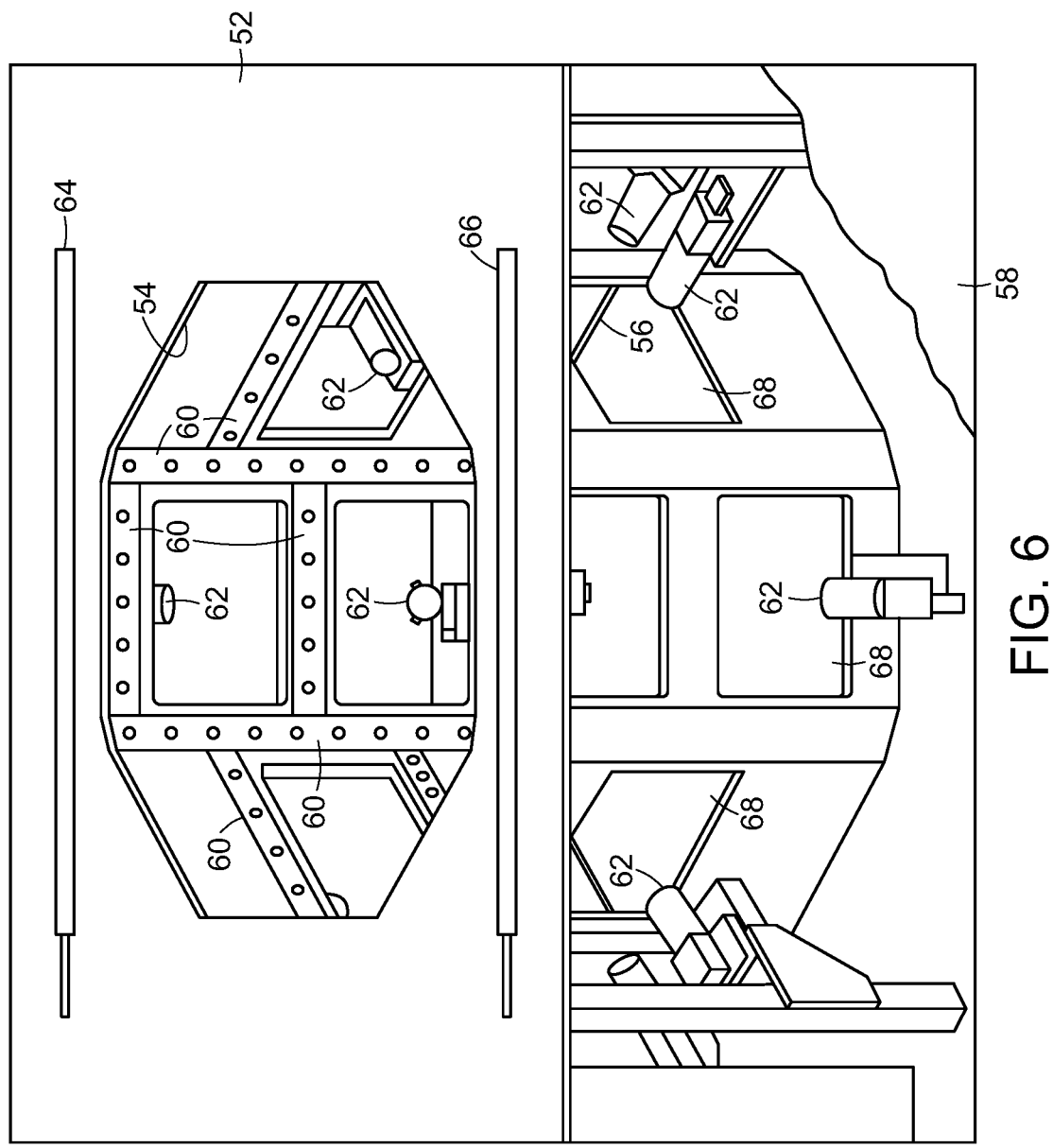
FIG. 6 shows an illustrative diagrammatic front view of the drop perception system of FIG. 1.
Figure 7:
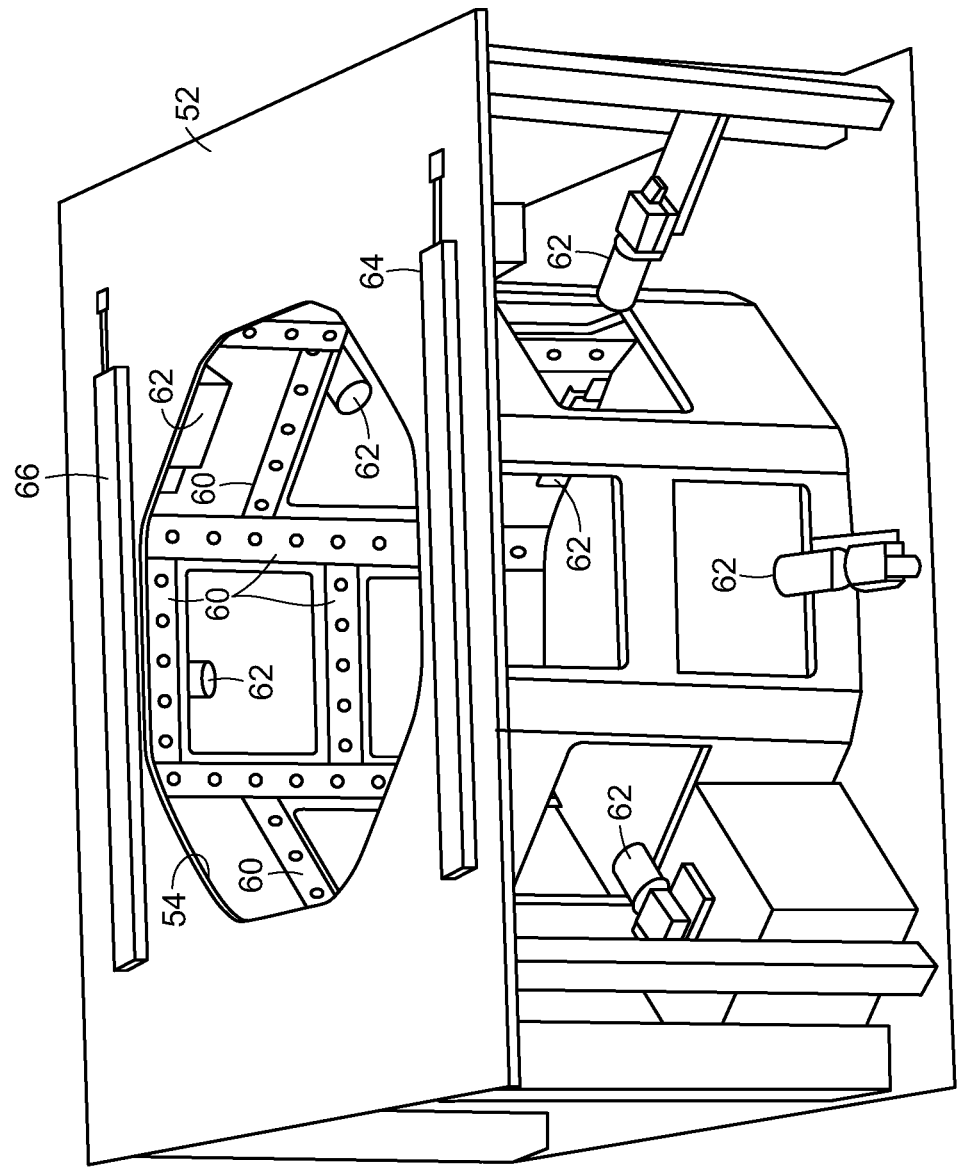
FIG. 7 shows an illustrative diagrammatic rear view of the drop perception system of FIG. 1.

The perception system 34 may be supported by stands or may be suspended from above. As further shown in FIGS. 6 and 7, the perception system 34 may include a structure 52 having a top opening 54 and a bottom opening 56, and may be covered by an enclosing material 58. The structure 52 includes a plurality of sources (e.g., illumination sources such as LEDs) 60 as well as a plurality of image perception units (e.g., cameras) 62. The sources 60 may be provided in a variety of arrangements, and each may be directed toward the center of the opening. The perception units 62 are also generally directed toward the opening, although some cameras are directed horizontally, while others are directed upward, and some are directed downward. The system 34 also includes an entry source (e.g., infrared source) 64 as well as an entry detector (e.g., infrared detector) 66 for detecting when an object has entered the perception system 34. The LEDs and cameras therefore encircle the inside of the structure 52, and the cameras are positioned to view the interior via windows that may include a glass or plastic covering (e.g., 68).

An aspect of certain embodiments of the present invention, is the ability to identify via barcode or other visual markings of objects by employing a perception system into which objects may be dropped. Automated scanning systems would be unable to see barcodes on objects that are presented in a way that their barcodes are not exposed or visible to a single camera. The system 34 therefore is designed to view an object from a large number of different views very quickly, reducing or eliminating the possibility of the system 34 not being able to view identifying indicia on an object.

Key features in the perception system are the specific design of the perception system so as to maximize the probability of a successful scan, while simultaneously minimizing the average scan time. The probability of a successful scan and the average scan time make up key performance characteristics. These key performance characteristics are determined by the configuration and properties of the perception system, as well as the object set and how they are marked.

The two key performance characteristics may be optimized for a given item set and method of labeling. Parameters of the optimization for a system include how many scanners, where and in what orientation to place them, and what sensor resolutions and fields of view for the scanners to use. Optimization can be done through trial and error, or by simulation with models of the object.

Optimization through simulation employs a scanner performance model. A scanner performance model is the range of positions, orientations and barcode element size that an identifying symbol can be detected and decoded by the scanner, where the barcode element size is the size of the smallest feature on the symbol. These are typically rated at a minimum and maximum range, a maximum skew angle, a maximum pitch angle, and a minimum and maximum tilt angle.

Typical performance for camera-based scanners are that they are able to detect symbols within some range of distances as long as both pitch and skew of the plane of the symbol are within the range of plus or minus 45 degrees, while the tilt of the symbol can be arbitrary (between 0 and 360 degrees). The scanner performance model predicts whether a given symbol in a given position and orientation will be detected.

The scanner performance model is coupled with a model of where symbols would expect to be positioned and oriented. A symbol pose model is the range of all positions and orientations, in other words poses, in which a symbol will expect to be found. For the scanner, the symbol pose model is itself a combination of an article gripping model, which predicts how objects will be held by the robotic system, as well as a symbol-item appearance model, which describes the possible placements of the symbol on the object. For the scanner, the symbol pose model is itself a combination of the symbol-item appearance model, as well as an inbound-object pose model, which models the distribution of poses over which inbound articles are presented to the scanner. These models may be constructed empirically, modeled using an analytical model, or approximate models may be employed using simple sphere models for objects and a uniform distribution over the sphere as a symbol-item appearance model.

The operations of the systems described herein are coordinated by the central control system 78 as shown in FIGS. 1-3, 5, 8 and 10. The central control system is comprised of one or more workstations or central processing units (CPUs). The correspondence between barcodes, for example, and outbound destinations is maintained by the central control system in a database called a manifest. The central control system maintains the manifest by communicating with a warehouse management system (WMS).

If the perception system successfully recognizes a marking on the object, then the object is then identified and forwarded to a sorting station or other processing station. If the object is not identified, the robotic system may divert the object to a human sortation bin 76 to be reviewed by a human.

Figure 8:
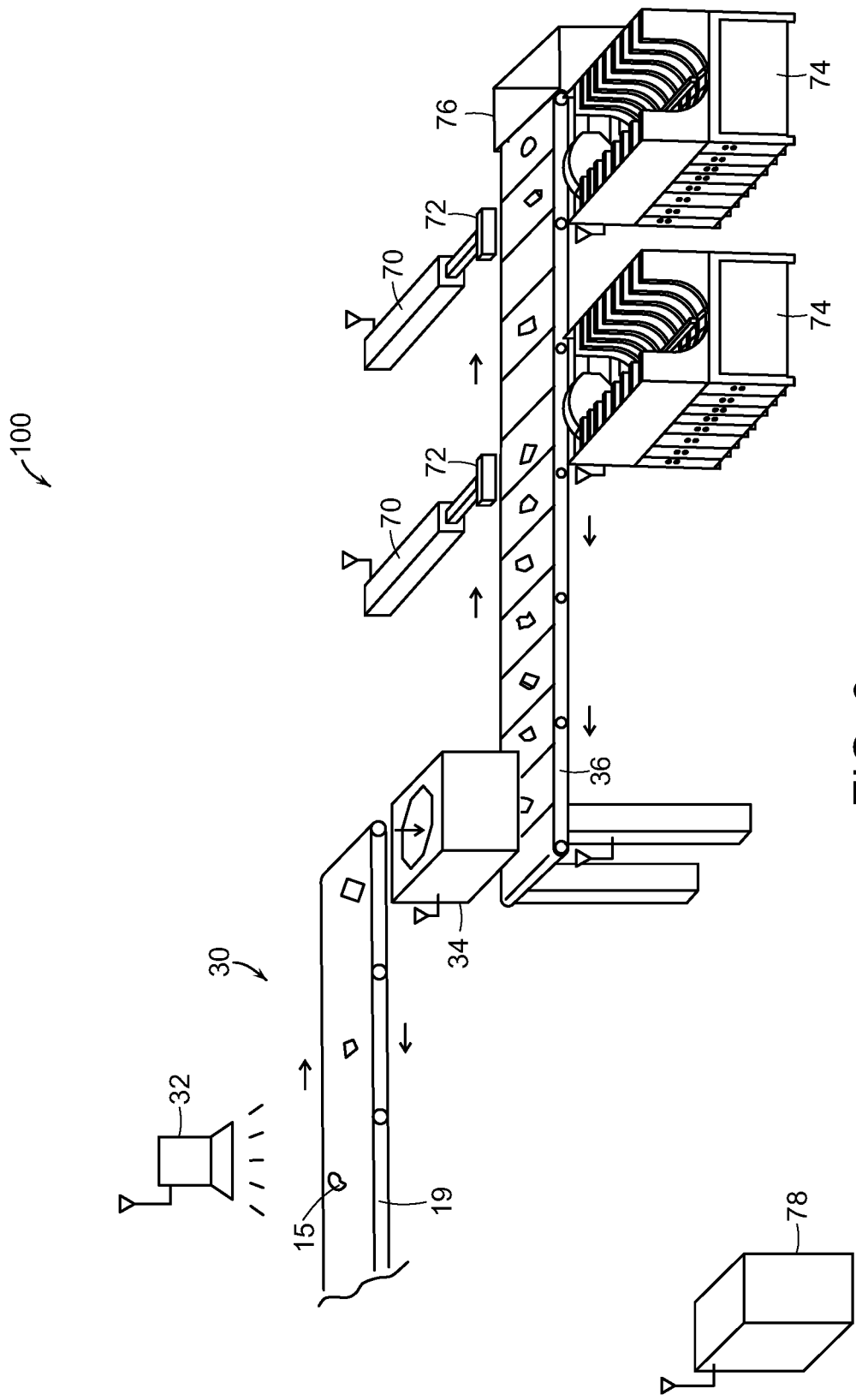
FIG. 8 shows an illustrative diagrammatic view of an object distribution system in accordance with an embodiment of the invention.

With reference to FIG. 8, in a processing system 100 of an embodiment of the invention, objects 14 passing through the secondary perception unit 34 fall onto secondary conveyor 36. Diverters 70 including push bars 72 divert objects to shuttle sections 74 as appropriate. While only two such diverters and shuttle sections are shown, any number of such diverters and shuttle sections may be used. Unidentified objects or otherwise unacceptable objects continue along secondary conveyor 36 and fall into secondary exception bin 76. The diverters 70 are in communication with the controller 78, which is in communication with the scanner 32 as well as the indexing position of the conveyor 19. Once an object falls through the scanner and lands on the conveyor 36, the system notes the conveyor position of the object. The scanner information is processed, and the object (if identified) is associated with that conveyor location, and its processing location is identified (as discussed in more detail below). As the conveyor advances, the system will know when the object is in the line of activation of a selected diverter, and will activate the diverter to push the object into the appropriate carriage. The carriage then moves the object to the assigned bin as discussed in more detail below. In various embodiments, the diverters may push an object off through various other ways, such as using a robot or a diverting guide, and in further embodiments, the diverters may pull an object off of the conveyor.

Figure 9:
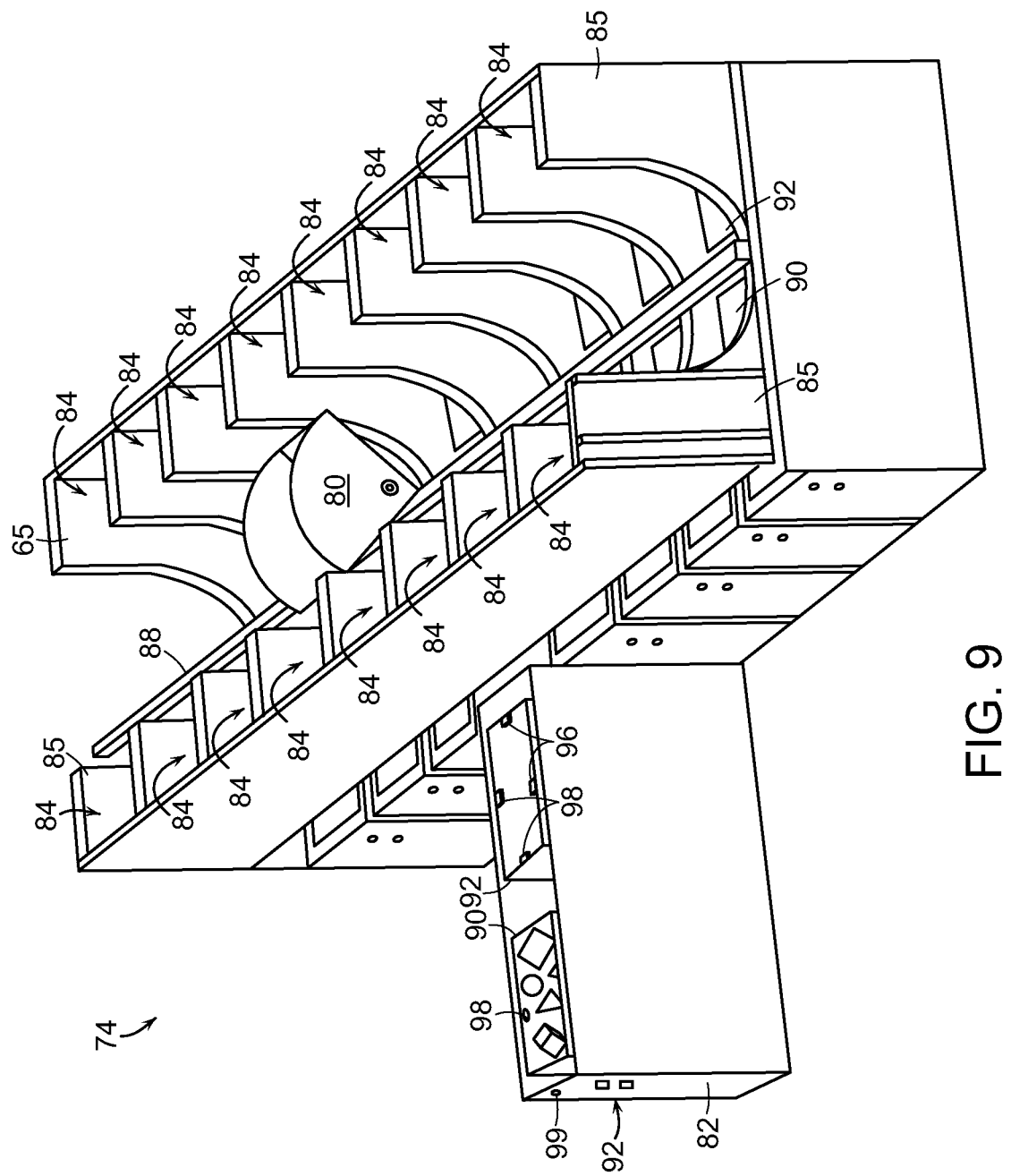
FIG. 9 shows an illustrative diagrammatic view of a shuttle wing sortation system of FIG. 8.

As further shown with reference to FIG. 9, each shuttle section 74 incudes a carriage 80 that shuttles back and forth between destination chutes 84 that include guide walls 85 that lead to two rows of bins 90, 92 on either side of track 88. Again, a central computing and control station 78 communicates with other computers distributed in the other components, and also communicates with the customer information system, provides a user interface, and coordinates all processes. As shown in FIG. 9, each processing bin 90, 92 of each shuttle section 74 may include a pull out drawer 82 from which each of the two opposing processing bins (e.g., 90, 92) may be accessed and emptied. Each pull-out drawer 82 may also include light indicators 94 to indicate when the processing bin (e.g., 90, 92) is either full or is ready to be emptied based on system heuristics, e.g., that the bin is statistically unlikely to receive another object soon. In other embodiments, such lights may be positioned above the respective bin. Each drawer may also include a lock 99 that a person must unlock to pull out the drawer 82. The lock includes sensors that communicate with the controller 78, and when a drawer is unlocked, the system knows not to sort to either bin in the unlocked drawer. This way, the system may continue operating while drawers are pulled and bins are emptied.

Figure 10:
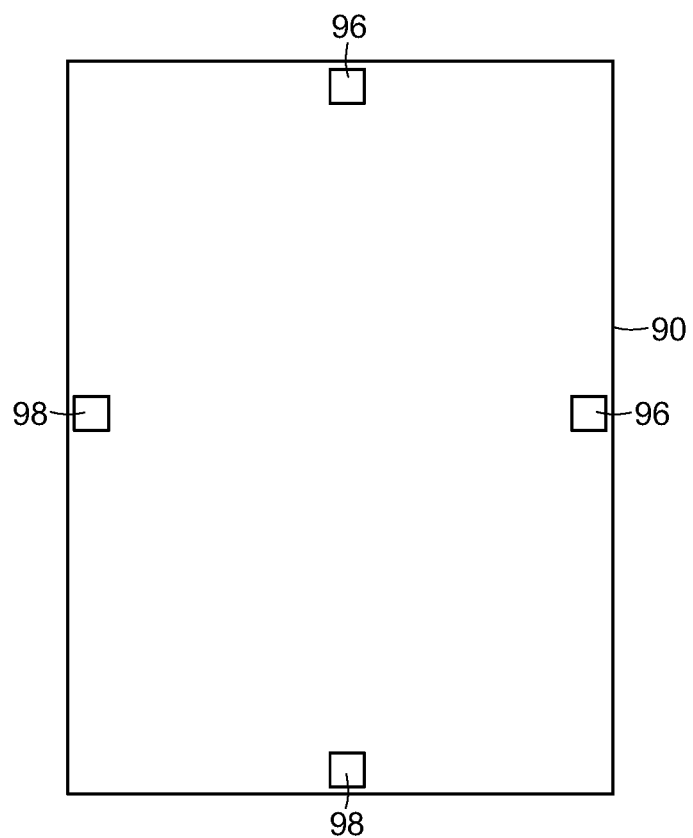
FIG. 10 shows an illustrative top view of a destination location in the shuttle wing sortation system of FIG. 9.

As shown in FIG. 10, each bin (90, 92), may include one or more pairs of emitters 96 and sensors 98 at the top of the bin. Output from a sensor 98 that is representative of a prolonged interruption from the associated source, may be used to determine that the bin is full.

Figure 11:
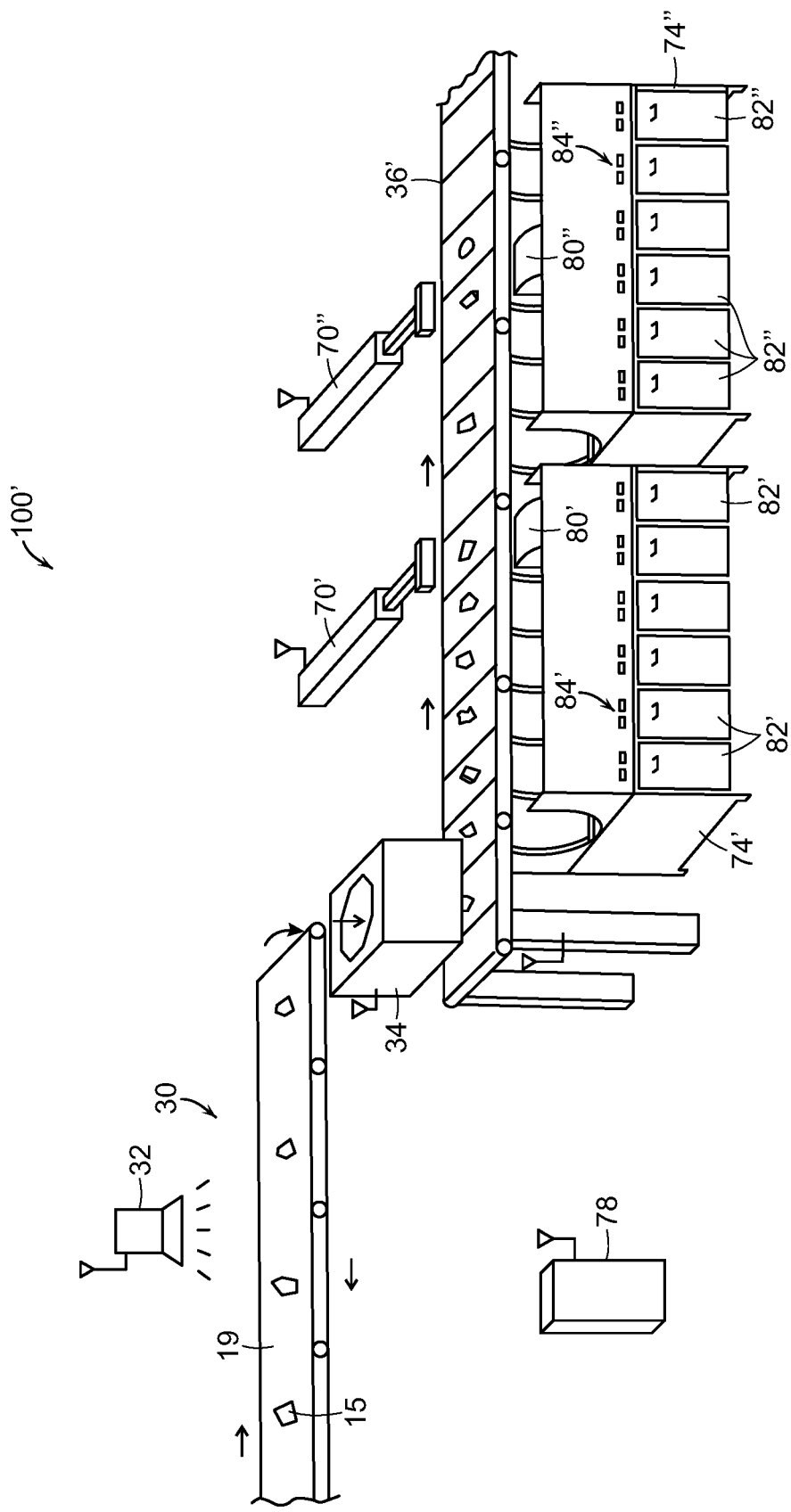
FIG. 11 shows an illustrative diagrammatic view of an object distribution system in accordance with another embodiment of the invention.

FIG. 11 shows a processing system 100' similar to that shown in FIG. 8 (where the identical components have the same reference numbers), except that the shuttle sections 74' of FIG. 8 are positioned alongside (parallel with) the conveyor 36'. In particular, a first diverter 70' may push an object into a carriage 80' at one end of a shuttle section 74', while a second diverter 70" may push an object into a carriage 80" in the middle of a shuttle section 74". In accordance with further embodiments, many different arrangements are possible, and each is within the spirit and scope of the present invention. Each drawer 82' and 82" may be discussed herein and the indicator lights 84', 84" may be located above the drawers 82', 82".

Similarly, the diverters 70', 70" are in communication with the controller 78, which is in communication with the scanner 34 as well as the indexing position of the conveyor 36'. Again, in various embodiments, the diverters may push an object off through various other ways, such as using a robot or a diverting guide, and in further embodiments, the diverters may pull an object off of the conveyor. Once an object falls through the scanner and lands of the conveyor, the system notes the conveyor position of the object. The scanner information is processed, and the object (if identified) is associated with that conveyor location, and its processing location is identified (as discussed in more detail below). Again, as the conveyor advances, the system will know when the object is in the line of activation of a selected diverter, and will activate the diverter to push the object into the appropriate carriage. The carriage then moves the object to the assigned bin as discussed in more detail below.

Figure 12:
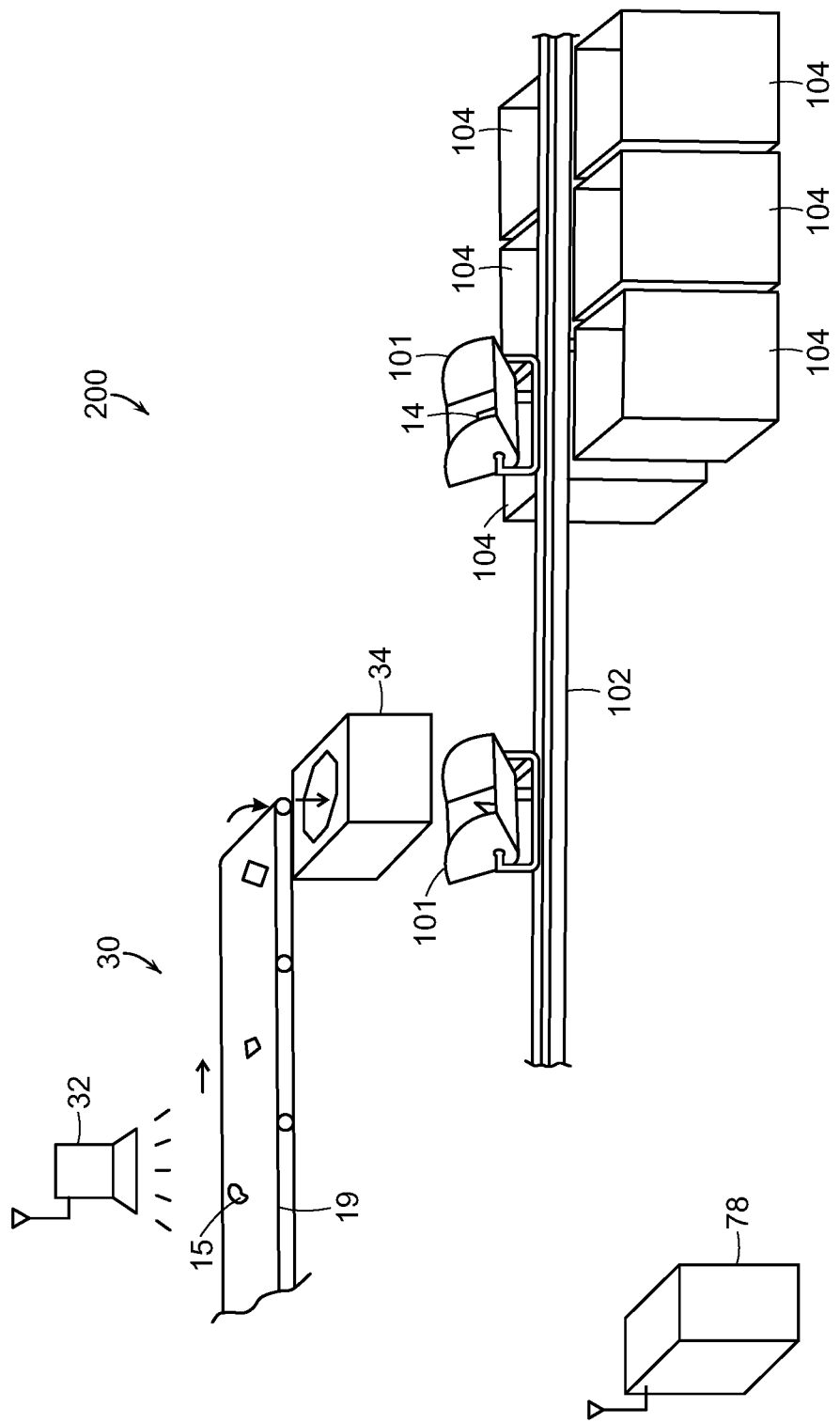
FIG. 12 shows an illustrative diagrammatic view of an object distribution system in accordance with a further embodiment of the invention.
Figure 13:
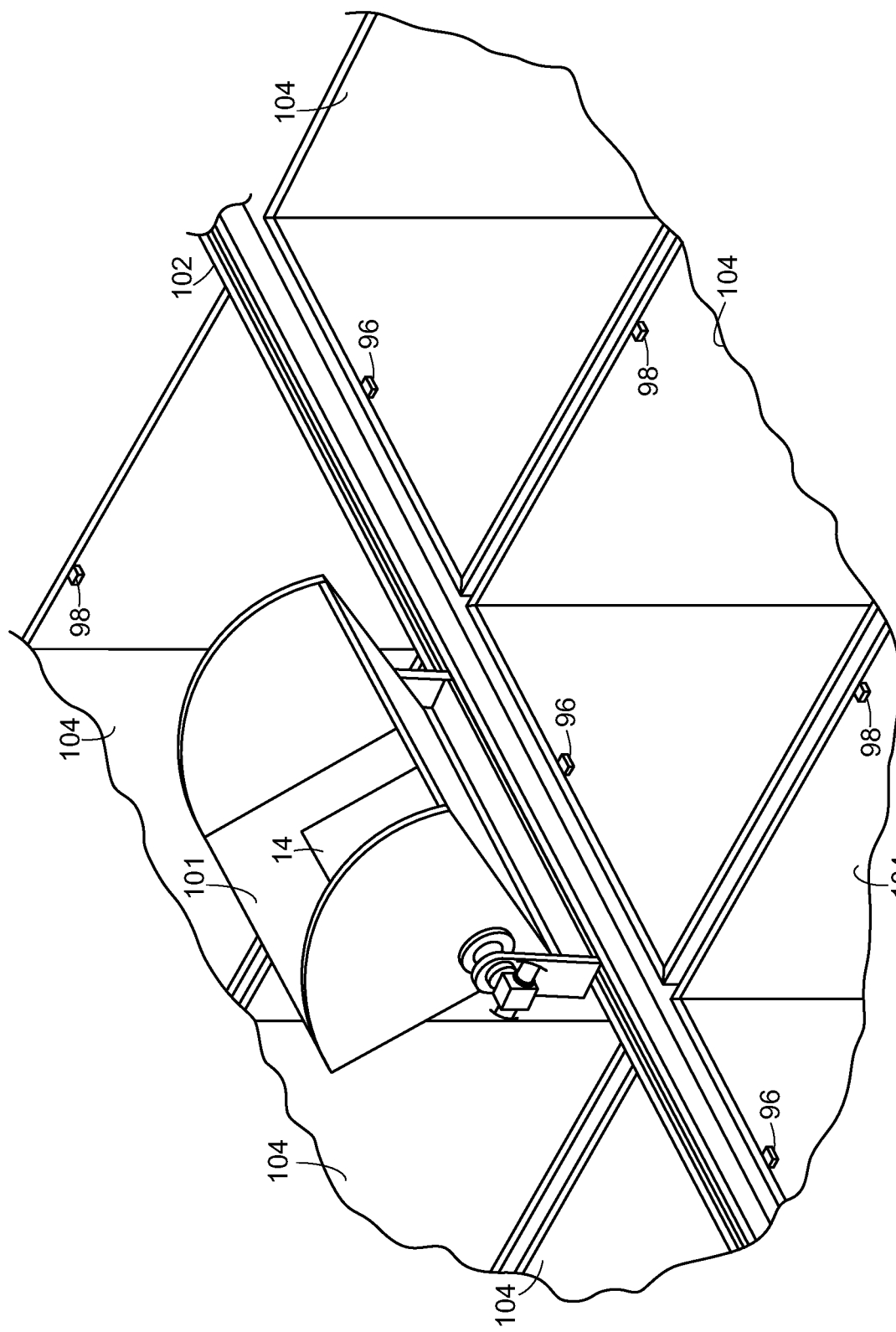
FIG. 13 shows an illustrative diagrammatic view of a portion of the shuttle wing processing system of FIG. 12.
Figure 14:
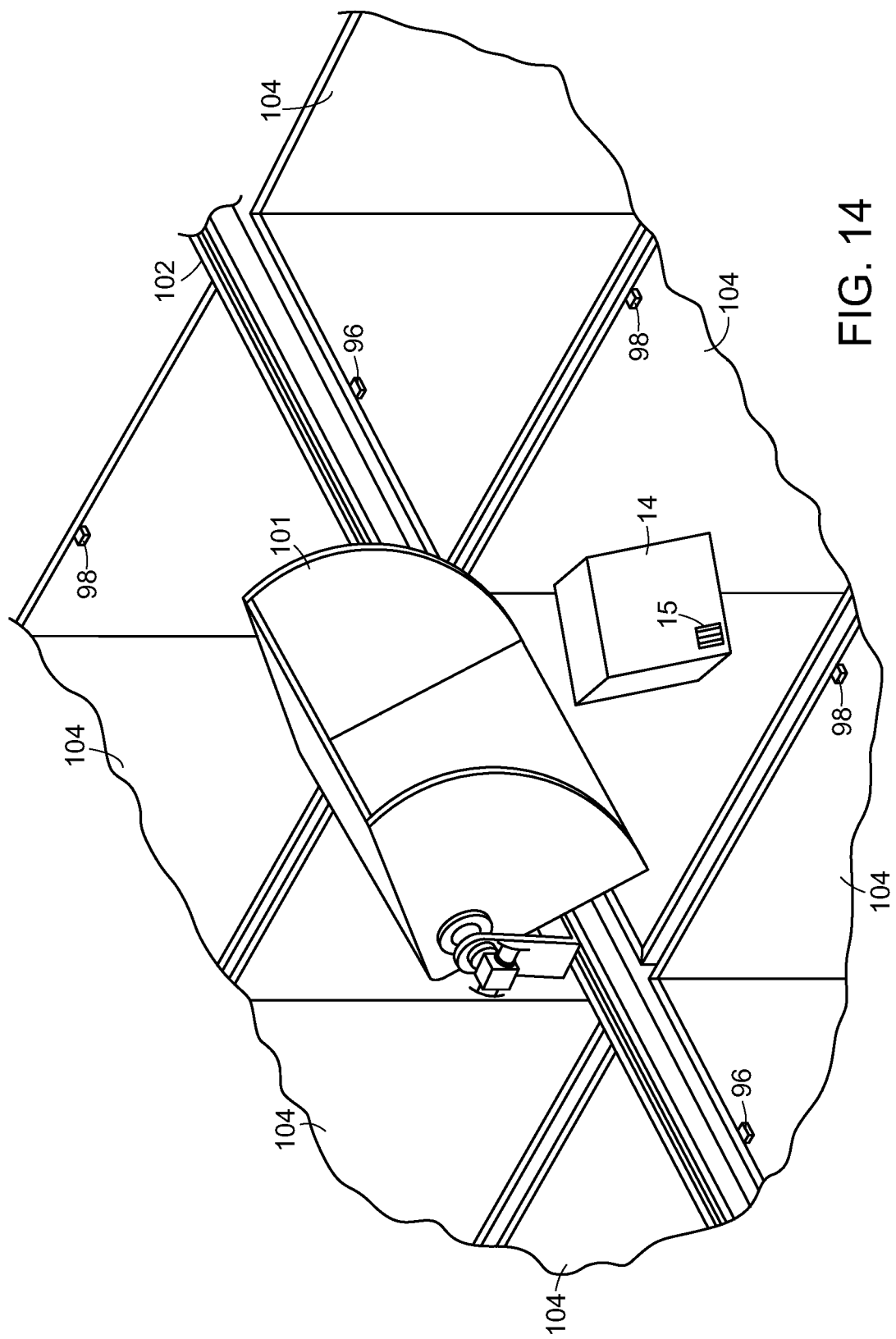
FIG. 14 shows an illustrative diagrammatic view of the portion of the shuttle wing processing system of FIG. 13, with an object being dropped from the carriage.

FIG. 12 shows a processing system 200 similar to that of systems 100, 100' (with similar elements bearing similar reference numerals), except that the system 200 includes carriages 101 that ride along a track (e.g., a circular track) 102. When a carriage 101 is positioned below the drop scanner 34, an object falls through the scanner and is identified as discussed above. The carriage 101 is then moved between rows of bins 104. With further reference to FIGS. 13 and 14, when the carriage 101 is moved to a desired processing location, the carriage stops (or slows), and tilts to dump the object 14 into the bin 104 (as shown in FIG. 14) similar to the action of carriage 80 discussed above. Again, the object 14 may include indicia 15 such as a barcode that was detected by the scanner 34. Similar to the embodiment of FIG. 9, guide walls may be used to guide the object as it falls so that the object does not accidently drop into a neighboring bin, and sensors (e.g., emitter/detector pairs) 96, 98 may be employed to detect when a bin is full as discussed above.

Figure 15:
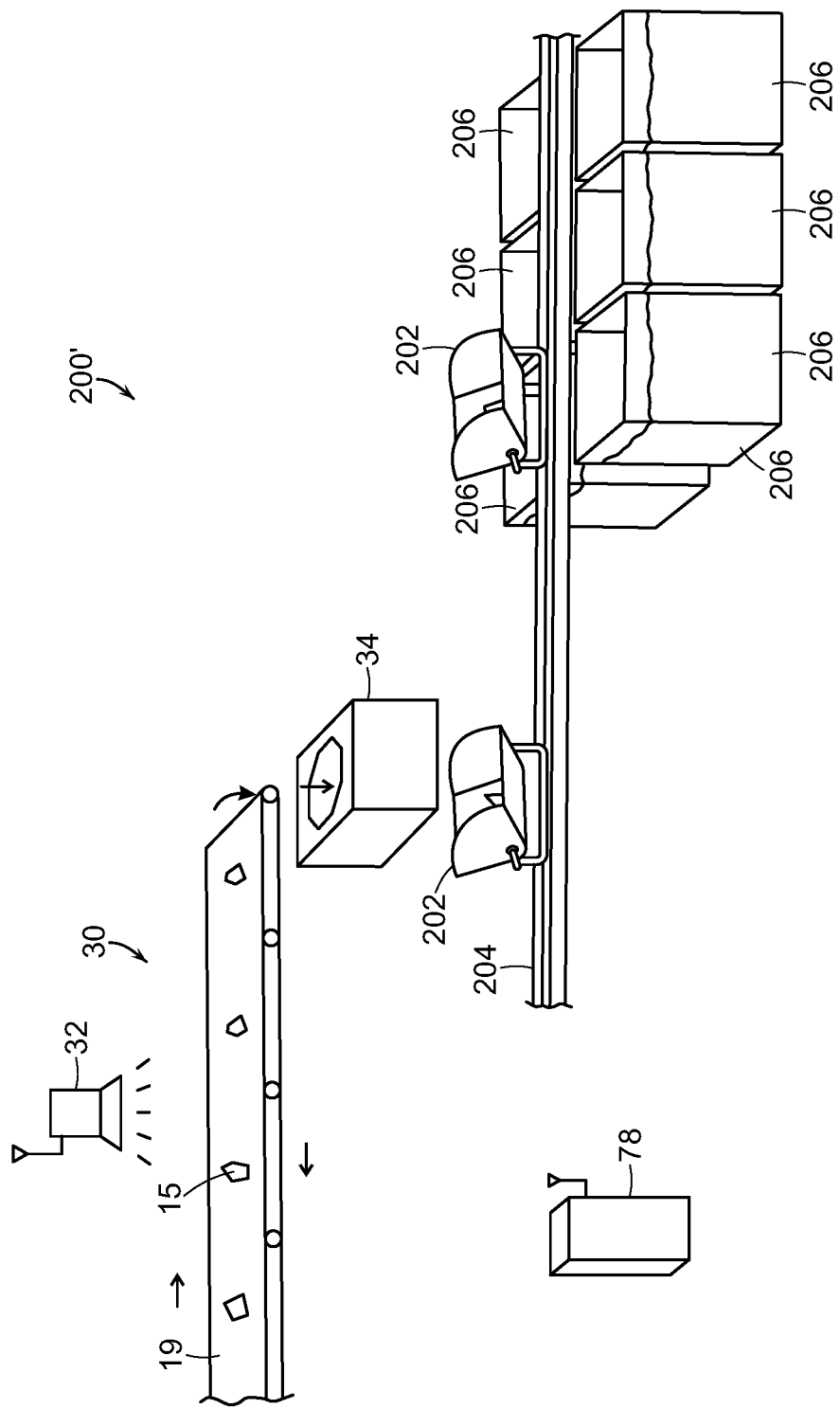
FIG. 15 shows an illustrative diagrammatic view of an object distribution system in accordance with yet a further embodiment of the invention.
Figure 16:
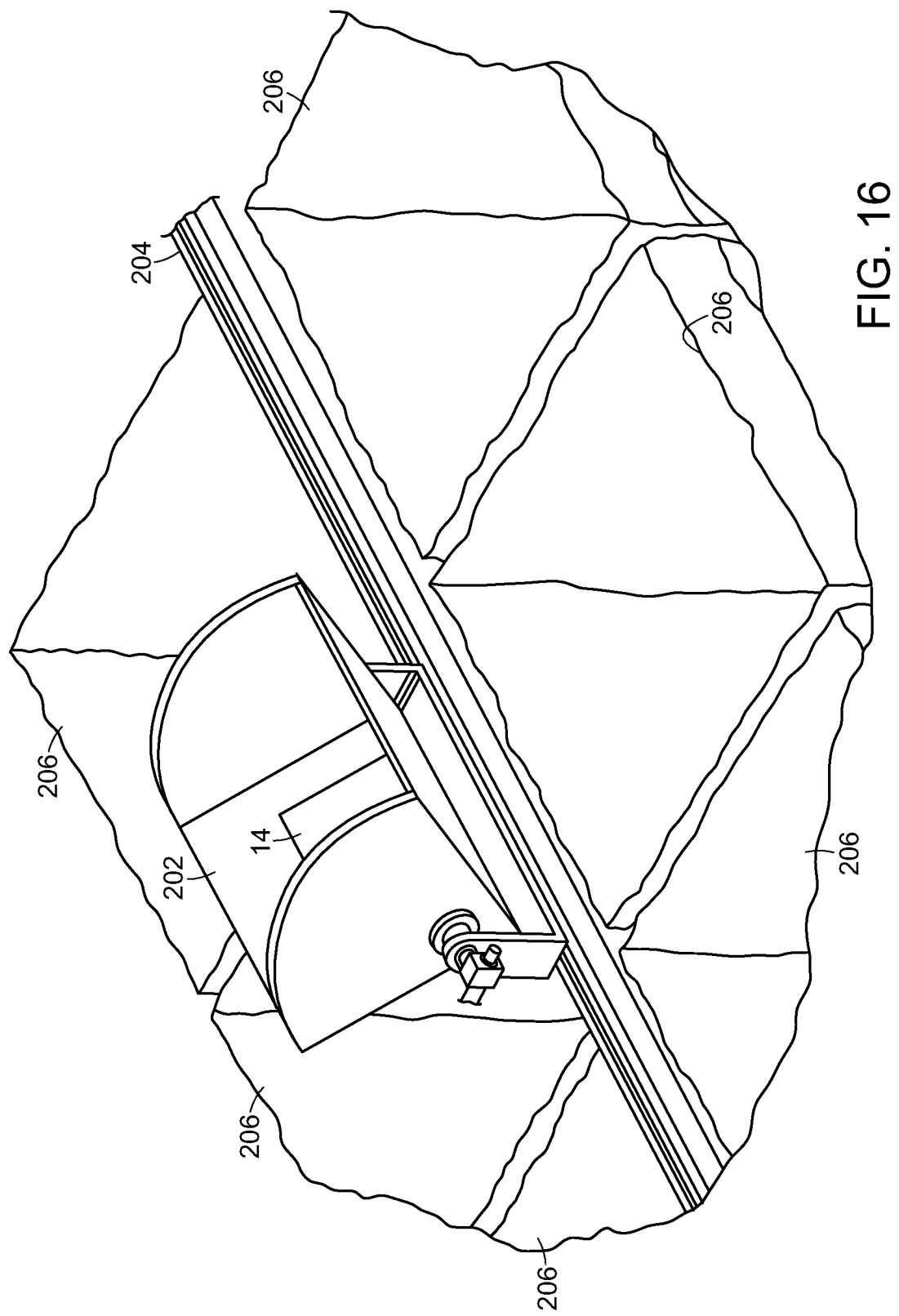
FIG. 16 shows an illustrative diagrammatic view of a portion of the shuttle wing processing system of FIG. 15.
Figure 17:
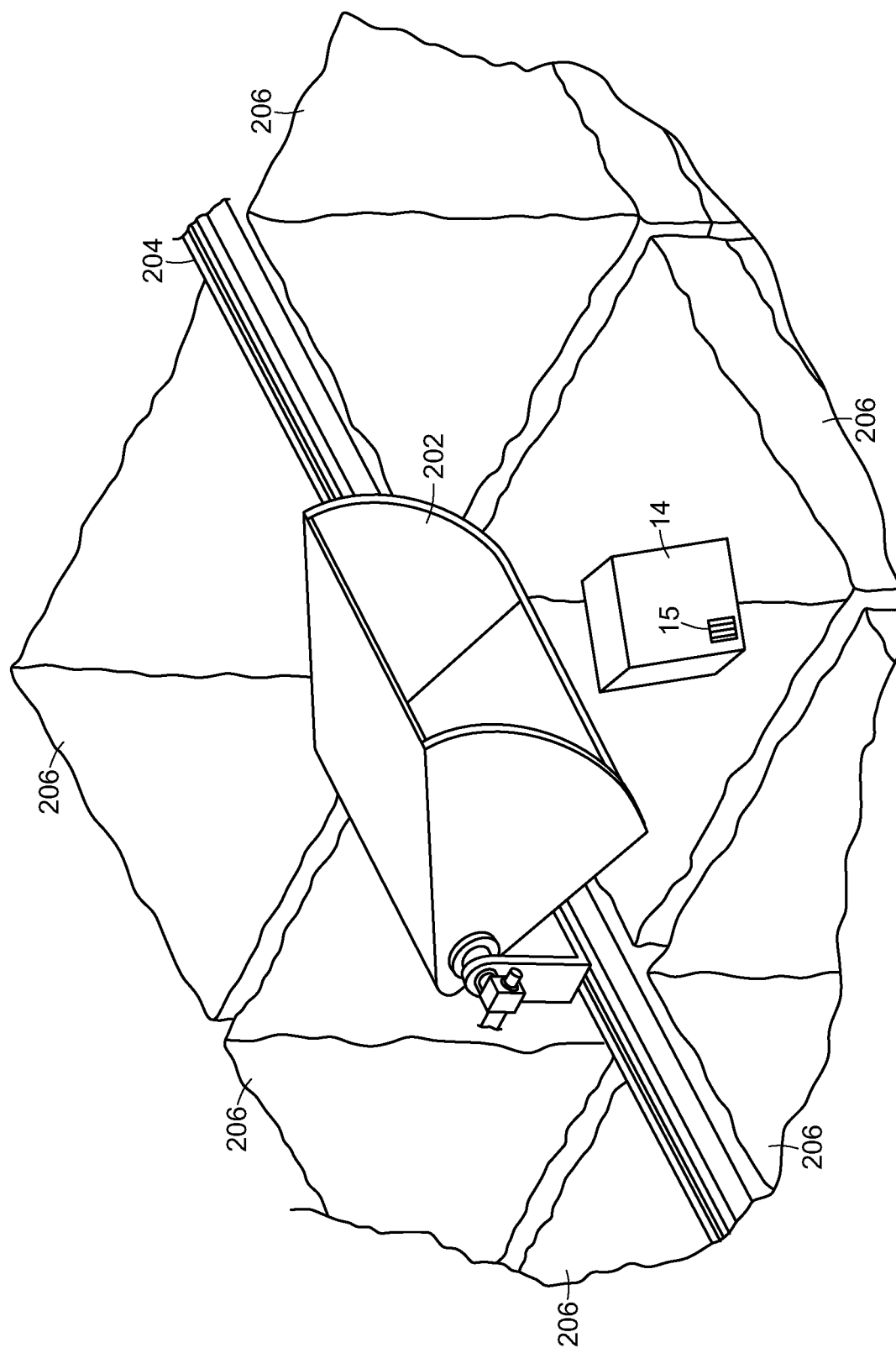
FIG. 17 shows an illustrative diagrammatic view of the portion of the shuttle wing processing system of FIG. 16, with an object being dropped from the carriage.

FIG. 15 shows a processing system 200' similar to that of systems 100, 100' and 200 (with similar elements bearing similar reference numerals), except that the system 200' includes carriages 202 that ride along a track (e.g., a circular track) 204. When a carriage 202 is positioned below the drop scanner 34, an object falls through the scanner and is identified as discussed above. The carriage 202 is then moved between rows of bins 206, each of which may include, for example a pre-placed bag. With further reference to FIGS. 16 and 17, when the carriage 202 is moved to a desired processing location, the carriage stops (or slows), and dumps the object 14 into the bin 206 (as shown in FIG. 16) similar to the action of carriage 80 discussed above. Again, the object 14 may include indicia 15 such as a barcode that was detected by the scanner 34.

Figure 18:
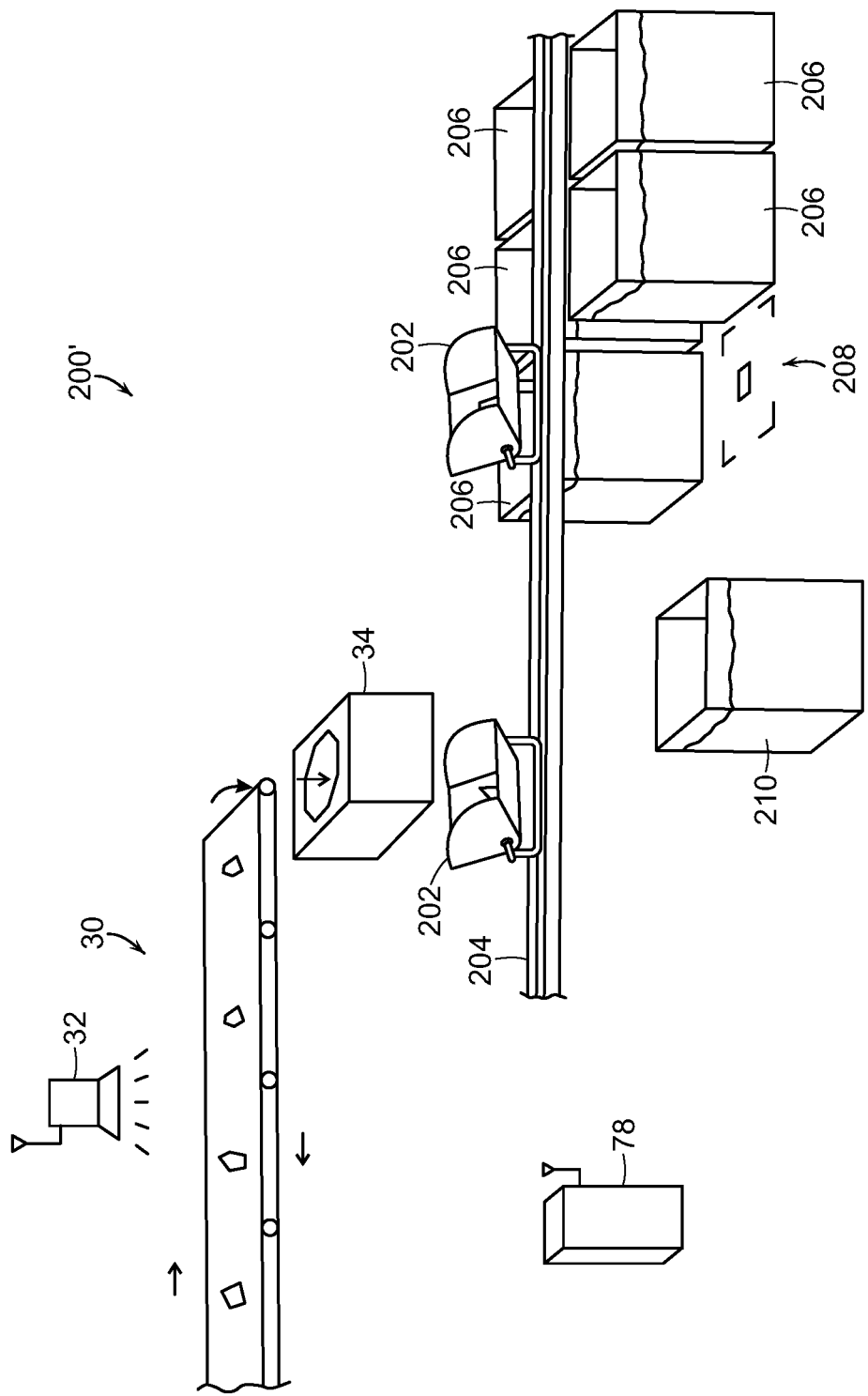
FIG. 18 shows an illustrative diagrammatic view of the object distribution system of FIG. 15 showing a destination bin position sensor.

As further shown in FIG. 18, when a bin 206 is full (e.g., by sensors as discussed above, or by the system knowing how many items are in the bin, or by having a human simply decide that a bin is full) a human may then pick up the bin 206. Upon removing the bin 206, a sensor system 208 under the bin will indicate that the bin (that specific bin) has been removed. The system may continue processing other bins, but will know not to sort to the removed bin. A new empty bin 210 may then be replaced on the opened location. Because the assignment of bin processing locations is dynamic and flexible, no further registration is required. As soon as the bin 210 is placed on the sensor 208, the system will know that there is a new unassigned bin ready for dynamic processing as discussed further below.

The assignment of processing bins may also be dynamic. For example, systems in accordance with further embodiments, provide improved transport and conveyor systems to provide a singulated stream of objects, and to provide dynamically changing patterns of object handling, with resulting efficiencies in the sortation process, lower space requirements, lower demand for manual operations, and as a consequence, lower capital and operating costs for the entire system.

During use, the sorting station may select an object and then identify the selected object by the perception system 32 (or may detect an identity of an object using a scanner on the articulated arm, or may use the robotic arm to move the object to a detection device). If the object has an assigned bin or a new bin is available, then the end effector will drop the object from the carriage into the bin. If the object is not identified the object may be dropped into a designated exception bin that is part of the shuttle wing, or the object may continue traveling in the carriage 202 along the track 204 and later be dropped into an exception bin 76 (e.g., as discussed above with reference to FIG. 8).

The system assigns a bin to the object if a new bin is available and the object is not yet assigned a bin at that sorting station. What is significant is that the sorting station is not pre-assigned a large set of collection bins assigned to all possible objects that may appear in the input path. Further, the central controller may employ a wide variety of heuristics that may further shape the process of dynamically assigning objects to collection bins as discussed in more detail below. Once bins are either filled or otherwise completed, the completed bins are signaled as being done and ready for further processing (e.g., by lights 92 associated with bin 90, 92 in FIG. 10).

Figure 19:
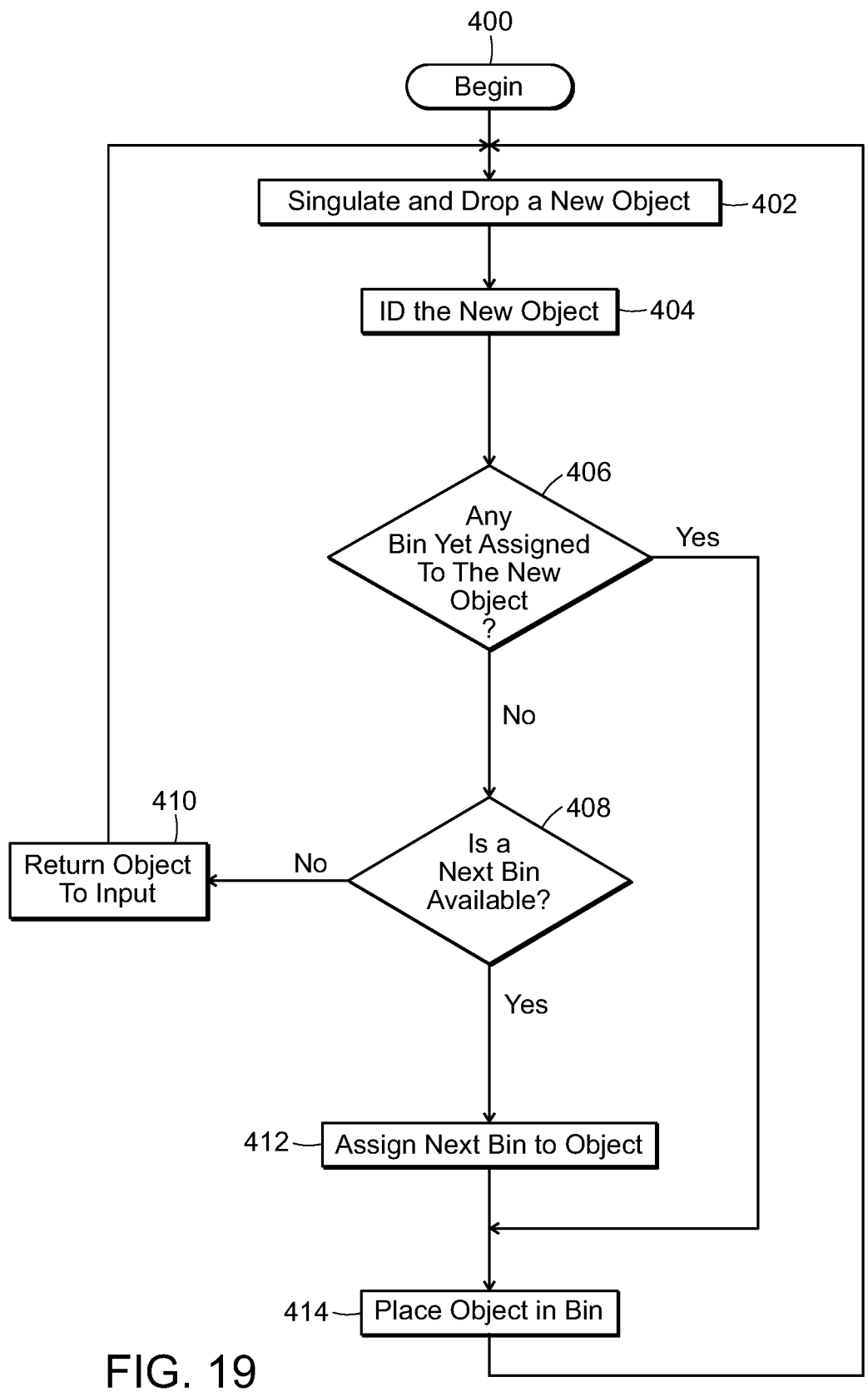
FIG. 19 shows an illustrative diagrammatic view of a flowchart showing selected processing steps in a system in accordance with an embodiment of the present invention.

As shown in FIG. 19, a sortation process of the invention at a sorting station may begin (step 400) by providing a singulated stream of objects that, one at a time, drop an object into the drop scanner (step 402). The system then identifies the new object (step 404). The system then will determine whether the object is yet assigned to any collection bin (step 406). If not, the system will determine whether a next bin is available (step 408). If no next bin is available (step 410), the robotic system will return the object to the input buffer (step 410) and return to step 402. Alternatively, the system can pick one of the collection bins that is in process and decide that it can be emptied to be reused for the object in hand, at which point the control system can empty the collection bin or signal a human worker to do it. If a next bin is available (and the system may permit any number of bins per station), the system will then assign the object to a next bin (step 412). The system then places the object into the assigned bin (step 414). The system then returns to step 402 until finished. Again, in certain embodiments, the secondary conveyor may be an indexed conveyor that moves in increments each time an object is dropped onto the conveyor. The system may then register the identity of the object, access a warehouse manifest, and determine an assigned bin location or assign a new bin location.

Figure 20:
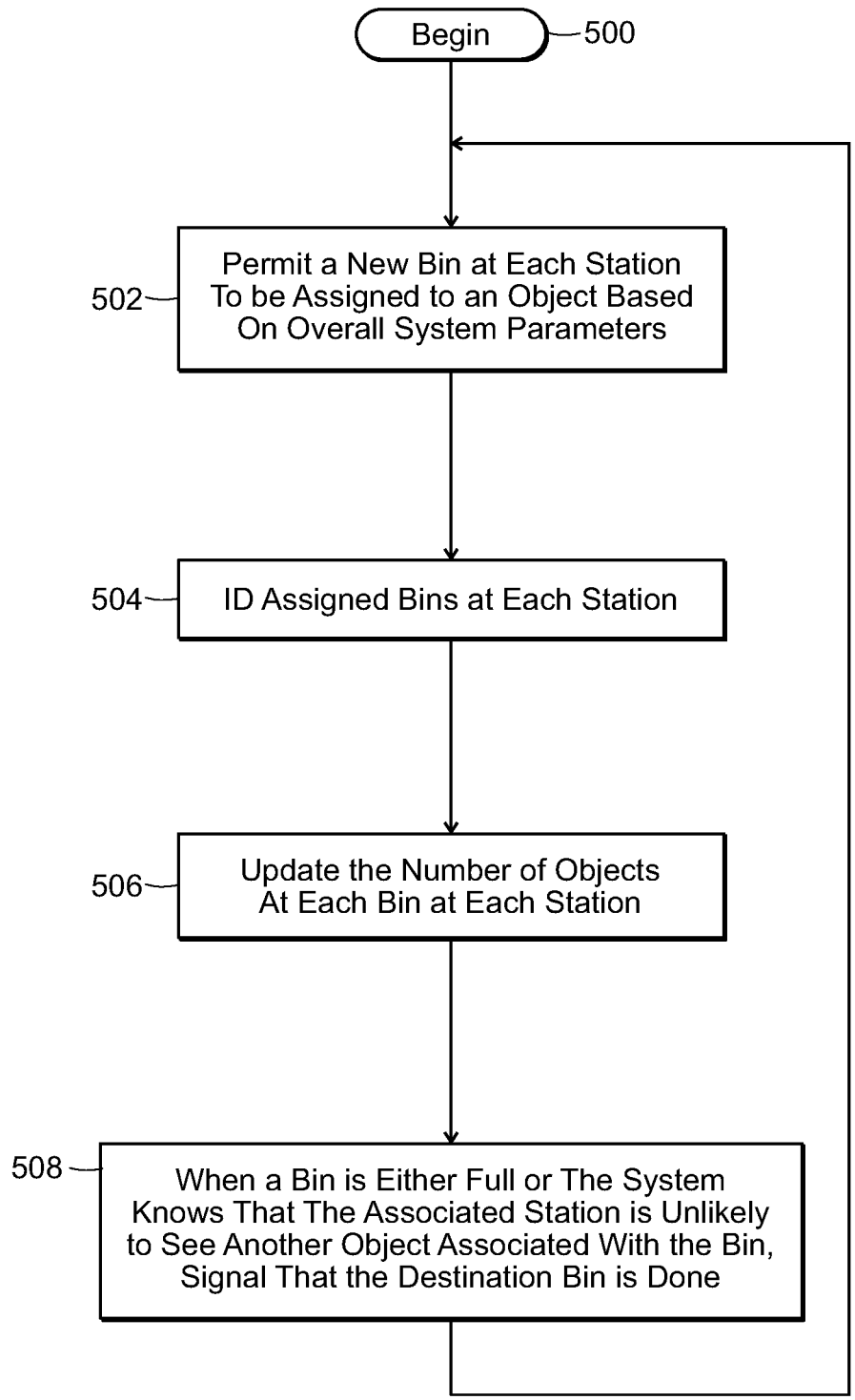
FIG. 20 shows an illustrative diagrammatic view of a flowchart showing bin assignment and management steps in a system in accordance with an embodiment of the present invention.

A process of the overall control system is shown, for example, in FIG. 20. The overall control system may begin (step 500) by permitting a new collection bin at each station to be assigned to a group of objects based on overall system parameters (step 502) as discussed in more detail below. The system then identifies assigned bins correlated with objects at each station (step 504), and updates the number of objects at each bin at each station (step 506). The system then determines that when a bin is either full or the system expects that the associated sorting station is unlikely to see another object associated with the bin, the associated sorting station robotic system will then place the completed bin onto an output conveyor, or signal a human worker to come and empty the bin (step 508), and then return to step 502.

Systems of various embodiments provide numerous advantages because of the inherent dynamic flexibility. The flexible correspondence between sorter outputs and destinations provides that there may be fewer sorter outputs than destinations, so the entire system may require less space. The flexible correspondence between sorter outputs and destinations also provides that the system may choose the most efficient order in which to handle objects, in a way that varies with the particular mix of objects and downstream demand. The system is also easily scalable, by adding sorters, and more robust since the failure of a single sorter might be handled dynamically without even stopping the system. It should be possible for sorters to exercise discretion in the order of objects, favoring objects that need to be handled quickly, or favoring objects for which the given sorter may have a specialized gripper.

In various embodiments therefore, the object processing system may include a carriage 80 that shuttles back and forth on a track between destination bins. A central computing and control station 78 communicates with other computers distributed in the other components, and also communicates with the customer information system, provides a user interface, and coordinates all processes. In other embodiments, the system may include a track (e.g., in a loop) along which carriages may travel in one direction past a plurality of destination bins.

Systems of various embodiments provide numerous advantages because of the inherent dynamic flexibility. The flexible correspondence between sorter outputs and destinations provides that there may be fewer sorter outputs than destinations, so the entire system may require less space. The flexible correspondence between sorter outputs and destinations also provides that the system may choose the most efficient order in which to handle objects, in a way that varies with the particular mix of objects and downstream demand. The system is also easily scalable, by adding sorters, and more robust since the failure of a single sorter might be handled dynamically without even stopping the system. It should be possible for sorters to exercise discretion in the order of objects, favoring objects that need to be handled quickly, or favoring objects for which the given sorter may have a specialized gripper.

The system provides in a specific embodiment an input system that interfaces to the customer's conveyors and containers, stores objects for feeding into the system, and feeds those objects into the system at a moderate and controllable rate. In one embodiment, the interface to the customer's process takes the form of a dumper from a Gaylord, but many other embodiments are possible. In one embodiment, feeding into the system is by an inclined cleated conveyor with overhead flow restrictors, e.g., baffles. In accordance with certain embodiments, the system feeds objects in at a modest controlled rate. Many options are available, including variations in the conveyor slope and speed, the presence, size and structure of cleats and baffles, and the use of sensors to monitor and control the feed rate.

The system includes in a specific embodiment a primary perception system that monitors the stream of objects on the primary conveyor. Where possible the primary perception system may identify the object to speed or simplify subsequent operations. For example, knowledge of the objects on the primary conveyor may enable the system to make better choices regarding which objects to move to provide a singulated stream of objects.

Those skilled in the art will appreciate that numerous modifications and variations may be made to the above disclosed embodiments without departing from the spirit and scope of the present invention.

What is claimed is:

1. A method of processing objects, said method comprising:
   moving objects to be processed from a source area;
   detecting objects on a conveying system;
   selecting certain selected objects for redistribution on the conveying system;
   redistributing the certain selected objects on the conveying system by moving the certain selected objects, using an end effector of a programmable motion device, to provide a singulated stream of objects on the conveying system, each of the objects of the singulated stream of objects being provided one per a predefined zone on the conveying system, said predefined zone being provided as one of a plurality of zones;
   passing each of the objects of the singulated stream of objects through a perception system towards a further conveying system, the perception system including a plurality of perception units that provide perception data for identifying each of the objects of the singulated stream of objects;
   moving each of the objects of the singulated stream of objects along the further conveying system; and urging an object among the singulated stream of objects from the further conveying system toward a destination location based on the perception data.

2. The method as claimed in claim 1, wherein the source area includes a contained area from which objects are drawn by an input cleated conveyor to the conveying system.

3. The method as claimed in claim 1, wherein redistributing the certain selected objects includes providing one object per cleated area of a cleated conveyor of the conveying system.

4. The method as claimed in claim 1, wherein moving the objects to be processed includes moving the objects on a conveyor that moves in discrete increments.

5. The method as claimed in claim 1, wherein moving the objects to be processed includes the use of a plurality of conveyors.

6. The method as claimed in claim 1, wherein redistributing the certain selected objects includes moving an object upstream on the conveying system from a current location into one of the plurality of zones.

7. The method as claimed in claim 1, wherein redistributing the certain selected objects includes moving an object toward a center of one of the plurality of zones on the conveying system.

8. The method as claimed in claim 1, wherein passing each of the objects through the perception system includes dropping the objects to fall through the perception system.

9. The method as claimed in claim 8, wherein the perception system includes an opening in a housing of the perception system, and wherein the method further includes providing perception data from the plurality of perception units of the perception system for identifying each object dropped through the perception system onto the further conveying system.

10. The method as claimed in claim 9, wherein the plurality of perception units include a plurality of cameras, a plurality of scanners, or a combination thereof.

11. The method as claimed in claim 9, wherein urging the object among the singulated stream of objects from the further conveying system toward the destination location based on the perception data includes dropping the object into the perception system directly from the conveying system.

12. The method as claimed in claim 11, wherein urging the object among the singulated stream of objects from the further conveying system includes urging the object into a movable carriage.

13. The method as claimed in claim 12, wherein the movable carriage is reciprocally movable between a plurality of destination locations.

14. The method as claimed in claim 13, wherein the plurality of destination locations comprises opposing rows of processing bins.

15. The method as claimed in claim 14, wherein each processing bin is provided in a pull-out drawer.

16. A method of processing objects, said method comprising:
moving objects to be processed from a source area to a first end of a conveying system;
detecting objects on the conveying system;
selecting certain selected objects for redistribution on the conveying system;
redistributing the certain selected objects on the conveying system by moving the certain selected objects, using an end effector of a programmable motion device to the first end of the conveying system to provide a singulated stream of objects on the conveying system, each of the objects of the singulated stream of objects being provided one per a predefined zone on the conveying system;
passing each of the objects of the singulated stream of objects through a perception system towards a further conveying system, the perception system including a plurality of perception units that provide perception data for identifying each of the objects of the singulated stream of objects as each object passes through the perception system;
moving each of the objects of the singulated stream of objects along the further conveying system; and
urging an object among the singulated stream of objects from the further conveying system toward a destination location based on the perception data.

17. The method as claimed in claim 16, wherein the source area includes a contained area from which objects are drawn by an input cleated conveyor to the conveying system.

18. The method as claimed in claim 16, wherein redistributing the certain selected objects includes providing one object per cleated area of a cleated conveyor of the conveying system.

19. The method as claimed in claim 16, wherein moving the objects to be processed includes moving the objects on a conveyor that moves in discrete increments.

20. The method as claimed in claim 16, wherein moving the objects to be processed includes the use of a plurality of conveyors.

21. The method as claimed in claim 16, wherein redistributing the certain selected objects includes moving an object upstream on the conveying system from a current location into one of the plurality of zones.

22. The method as claimed in claim 16, wherein redistributing the certain selected objects includes moving an object toward a center of one of the plurality of zones on the conveying system.

23. The method as claimed in claim 16, wherein passing each of the objects through a perception system includes dropping the objects to fall through the perception system.

24. The method as claimed in claim 23, wherein the perception system includes an opening in a housing of the perception system, and wherein the method further includes providing perception data from a plurality of perception units of the perception system for identifying each object dropped through the perception system onto the further conveying system.

25. The method as claimed in claim 24, wherein the plurality of perception units include the plurality of cameras, a plurality of scanners, or a combination thereof.

26. The method as claimed in claim 24, wherein the method further includes urging one or more objects among the singulated stream of objects from the further conveying system into any of the plurality of destination areas adjacent to the further conveying system based on the perception data provided by the plurality of perception units.

27. The method as claimed in claim 26, wherein urging the object among the singulated stream of objects from the further conveying system includes urging the object into a movable carriage.

28. The method as claimed in claim 27, wherein the movable carriage is reciprocally movable between a plurality of destination locations.

29. The method as claimed in claim 28, wherein the plurality of destination locations comprises opposing rows of processing bins.

30. The method as claimed in claim 29, wherein each processing bin is provided in a pull-out drawer.

31. An object processing system comprising:
a conveying system for moving objects to be processed from a source area along a first direction;
a detection system for detecting objects at the conveying system, and for selecting certain selected objects for redistribution on the conveying system;
a movement redistribution system for redistributing the certain selected objects on the conveying system that includes a conveyor for providing a singulated stream of objects, said movement redistribution system including at least two programmable motion devices that cooperate to redistribute the certain selected objects such that at least one object is removed from a zone of a plurality of zones of the conveyor that includes two or more objects to generate a singulated stream of objects with at most one object in each of the plurality of zones, each of the programmable motion devices including an articulated arm and an attached end-effector;
a perception system including a plurality of perception units for providing perception data regarding an object of the singulated stream of objects as the object passes through the perception system; and
a further conveying system for moving the object to one of a plurality of destination locations responsive to the perception data.

32. The object processing system as claimed in claim 31, wherein the conveyor is a high-speed conveyor.

33. The object processing system as claimed in claim 31, wherein the source area includes a contained area from which an in-feed cleated conveyor draws objects to the conveying system.

34. The object processing system as claimed in claim 31, wherein the conveyor is a cleated conveyor and the movement redistribution system provides one object per cleated area on the cleated conveyor.

35. The object processing system as claimed in claim 31, wherein the conveyor moves in increments.

36. The object processing system as claimed in claim 31, wherein the plurality of destination areas includes a plurality of movable carriages, wherein each of the plurality of movable carriages is reciprocally movable along a track between opposing rows of processing bins for receiving the objects.

37. The object processing system as claimed in claim 36, further comprising a plurality of diverters that push the objects from the further conveying system into the plurality of movable carriages.

38. The object processing system as claimed in claim 36, further comprising a plurality of diverters that pull the objects from the further conveying system into the plurality of movable carriages.

\* \* \* \* \*